United States Patent
Affinito et al.

(10) Patent No.: US 7,771,870 B2
(45) Date of Patent: Aug. 10, 2010

(54) ELECTRODE PROTECTION IN BOTH AQUEOUS AND NON-AQUEOUS ELECTROCHEMICAL CELLS, INCLUDING RECHARGEABLE LITHIUM BATTERIES

(75) Inventors: John D. Affinito, Tucson, AZ (US);
Yuriy V. Mikhaylik, Tucson, AZ (US);
Yordan M. Geronov, Tucson, AZ (US);
Christopher J. Sheehan, Santa Fe, NM (US)

(73) Assignee: Sion Power Corporation, Tucson, AZ (US)

(*) Notice: Subject to any disclaimer, the term of this patent is extended or adjusted under 35 U.S.C. 154(b) by 1010 days.

(21) Appl. No.: 11/400,025

(22) Filed: Apr. 6, 2006

(65) Prior Publication Data
US 2007/0224502 A1  Sep. 27, 2007

Related U.S. Application Data

(60) Provisional application No. 60/785,768, filed on Mar. 22, 2006.

(51) Int. Cl.
*H01M 4/02* (2006.01)
*H01M 10/44* (2006.01)

(52) U.S. Cl. ............................ 429/209; 429/50; 429/122

(58) Field of Classification Search .................. 429/122, 429/209
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | Dejonghe et al. |
| 4,917,974 A | 4/1990 | De Jonghe et al. |
| 4,954,371 A | 9/1990 | Yializis |
| 5,162,175 A | 11/1992 | Visco et al. |

(Continued)

FOREIGN PATENT DOCUMENTS

JP  09-279357  10/1997

(Continued)

OTHER PUBLICATIONS

Shengli Zhao, A solid-state electrolyte lithium phosphorus oxynitride film prepared by pulsed laser deposition, Thin Solid Films vol. 415, Issues 1-2, Aug. 1, 2002, pp. 108-113.*

(Continued)

*Primary Examiner*—Patrick Ryan
*Assistant Examiner*—Brent Thomas
(74) *Attorney, Agent, or Firm*—Wolf, Greenfield & Sacks, P.C.

(57) ABSTRACT

Electrode protection in electrochemical cells, and more specifically, electrode protection in both aqueous and non-aqueous electrochemical cells, including rechargeable lithium batteries, are presented. In one embodiment, an electrochemical cell includes an anode comprising lithium and a multi-layered structure positioned between the anode and an electrolyte of the cell. A multi-layered structure can include at least a first single-ion conductive material layer (e.g., a lithiated metal layer), and at least a first polymeric layer positioned between the anode and the single-ion conductive material. The invention also can provide an electrode stabilization layer positioned within the electrode, i.e., between one portion and another portion of an electrode, to control depletion and re-plating of electrode material upon charge and discharge of a battery. Advantageously, electrochemical cells comprising combinations of structures described herein are not only compatible with environments that are typically unsuitable for lithium, but the cells may be also capable of displaying long cycle life, high lithium cycling efficiency, and high energy density.

19 Claims, 8 Drawing Sheets

U.S. PATENT DOCUMENTS

| | | | |
|---|---|---|---|
| 5,194,341 A | 3/1993 | Bagley et al. | |
| 5,314,765 A | 5/1994 | Bates et al. | |
| 5,324,599 A | 6/1994 | Oyama et al. | |
| 5,366,829 A | 11/1994 | Saidi | |
| 5,387,479 A | 2/1995 | Koksbang | |
| 5,415,954 A | 5/1995 | Gauthier | |
| 5,434,021 A | 7/1995 | Fauteux et al. | |
| 5,441,831 A | 8/1995 | Okamoto et al. | |
| 5,460,905 A | 10/1995 | Skotheim | |
| 5,462,566 A | 10/1995 | Skotheim | |
| 5,487,959 A | 1/1996 | Koksbang et al. | |
| 5,516,598 A | 5/1996 | Visco et al. | |
| 5,529,860 A | 6/1996 | Skotheim et al. | |
| 5,532,083 A * | 7/1996 | McCullough | 429/210 |
| 5,538,812 A | 7/1996 | Lee et al. | |
| 5,569,520 A | 10/1996 | Bates | |
| 5,601,947 A | 2/1997 | Skotheim et al. | |
| 5,648,187 A | 7/1997 | Skothiem et al. | |
| 5,681,615 A | 10/1997 | Affinito et al. | |
| 5,690,702 A | 11/1997 | Skotheim et al. | |
| 5,716,736 A | 2/1998 | Zhang et al. | |
| 5,723,230 A | 3/1998 | Naoi et al. | |
| 5,731,104 A | 3/1998 | Ventura et al. | |
| 5,783,330 A | 7/1998 | Naoi et al. | |
| 5,792,575 A | 8/1998 | Naoi et al. | |
| 5,824,434 A | 10/1998 | Kawakami et al. | |
| 5,834,137 A | 11/1998 | Zhang et al. | |
| 5,882,819 A | 3/1999 | Naoi et al. | |
| 5,961,672 A | 10/1999 | Skothiem et al. | |
| 6,025,094 A | 2/2000 | Visco et al. | |
| 6,117,590 A | 9/2000 | Skotheim et al. | |
| 6,153,337 A | 11/2000 | Carlson et al. | |
| 6,156,395 A | 12/2000 | Zhang et al. | |
| 6,183,901 B1 | 2/2001 | Ying et al. | |
| 6,201,100 B1 | 3/2001 | Gorkovenko et al. | |
| 6,202,591 B1 | 3/2001 | Witzman et al. | |
| 6,225,002 B1 | 5/2001 | Nimon et al. | |
| 6,268,695 B1 | 7/2001 | Affinito | |
| 6,276,355 B1 | 8/2001 | Zhang et al. | |
| 6,277,514 B1 | 8/2001 | Ying et al. | |
| 6,328,770 B1 | 12/2001 | Gozdz | |
| 6,395,423 B1 | 5/2002 | Kawakami et al. | |
| 6,508,921 B1 | 1/2003 | Mu et al. | |
| 6,517,968 B2 | 1/2003 | Johnson et al. | |
| 6,570,325 B2 | 5/2003 | Graff et al. | |
| 6,797,428 B1 * | 9/2004 | Skotheim et al. | 429/126 |
| 6,835,493 B2 | 12/2004 | Zhang et al. | |
| 6,852,139 B2 | 2/2005 | Zhang et al. | |
| 6,886,240 B2 | 5/2005 | Zhang et al. | |
| 7,204,862 B1 | 4/2007 | Zhang et al. | |
| 2001/0041294 A1 | 11/2001 | Chu et al. | |
| 2002/0071989 A1 | 6/2002 | Verma | |
| 2004/0175621 A1 * | 9/2004 | Iriyama et al. | 429/231.95 |
| 2004/0197641 A1 | 10/2004 | Visco et al. | |
| 2005/0051763 A1 | 3/2005 | Affinito et al. | |
| 2005/0100793 A1 | 5/2005 | Jonghe et al. | |
| 2005/0208353 A1 | 9/2005 | Johnson | |
| 2006/0222954 A1 | 10/2006 | Skotheim | |
| 2007/0117007 A1 | 5/2007 | Visco et al. | |
| 2007/0172739 A1 | 7/2007 | Visco | |
| 2007/0212583 A1 | 9/2007 | Johnson | |
| 2007/0221265 A1 | 9/2007 | Affinito et al. | |
| 2008/0070087 A1 | 3/2008 | Johnson | |

FOREIGN PATENT DOCUMENTS

| | | |
|---|---|---|
| WO | WO 97/44840 | 11/1997 |
| WO | WO 99/33125 | 7/1999 |
| WO | WO 01/33651 | 5/2001 |
| WO | WO 01/039302 | 5/2001 |
| WO | WO 01/39303 | 5/2001 |
| WO | WO 01/97304 | 12/2001 |
| WO | WO 02/071989 A1 | 9/2002 |
| WO | WO 2005/038953 | 4/2005 |

OTHER PUBLICATIONS

International Search Report, from PCT/US2007/006962, mailed Oct. 17, 2007.

International Search Report, from PCT/US2007/007005, mailed Sep. 14, 2007.

Affinito, J., et al., "A New Class of Ultra-Barrier Materials", 47$^{th}$ Annual Technical Conference Proceedings (2004) ISSN 0737-5921.

Affinito, J., et al., "High Rate Process for Deposition of Plasma Polymerized Films from High Molecular Weight/Low Vapor Pressure Liquid or Solid Monomer Precursor", 2$^{nd}$ International Symposium on Plasma Polymerization/Deposition: Fundamental and Applied Aspects (1999).

Affinito, J., et al., "High rate vacuum deposition of polymer electrolytes", J. Vac. Sci. Technol. A 14(3), (1996).

Graff, G., et al., "Mechanisms of vapor permeation through multilayer barrier films: Lag time versus equilibrium permeation", Journal of Applied Physics, 96(4), (2004).

Alamgir et al., "Room Temperature Polymer Electrolytes," Lithium Batteries, New Materials, Developments and Perspectives, Chapter 3, pp. 93-136, Elsevier, Amsterdam (1994).

Dominey, "Current State of the Art on Lithium Battery Electrolytes," Lithium Batteries, New Materials, Developments and Perspectives, Chapter 4, pp. 137-165, Elsevier, Amsterdam (1994).

Zhuang et al., "The Reaction of lithium with carbon dioxide studied by photoelectron spectroscopy," Surface Science, 418, pp. 139-149 (1998).

Office Communication mailed Mar. 5, 2009 for U.S. Appl. No. 11/452,445.

Response to Office Communication filed Jun. 5, 2009 for U.S. Appl. No. 11/452,445.

Office Communication mailed Sep. 15, 2009 for U.S. Appl. No. 11/452,445.

Response to Office Communication filed Dec. 17, 2009 for U.S. Appl. No. 11/452,445.

Advisory Action mailed Jan. 6, 2010 for U.S. Appl. No. 11/452,445.

Amendment/Response to Office Communication filed Mar. 10, 2010 for U.S. Appl. No. 11/452,445.

Office Communication mailed Mar. 20, 2009 for U.S. Appl. No. 11/781,915.

Response to Office Communication filed Jun. 11, 2009 for U.S. Appl. No. 11/781,915.

Office Communication mailed Aug. 20, 2009 for U.S. Appl. No. 11/781,915.

Response to Office Communication filed Nov. 5, 2009 for U.S. Appl. No. 11/781,915.

Advisory Action mailed Nov. 18, 2009 for U.S. Appl. No. 11/781,915.

Office Communication mailed Mar. 8, 2010 for U.S. Appl. No. 11/781,915.

Response to Office Communication filed Apr. 13, 2010 for U.S. Appl. No. 11/781,915.

Office Communication mailed Dec. 9, 2009 for U.S. Appl. No. 11/932,499.

Response to Office Communication filed Apr. 9, 2010 for U.S. Appl. No. 11/932,499.

Office Communication mailed Apr. 2, 2009 for U.S. Appl. No. 12/042,315.

Response to Office Communication filed Sep. 25, 2009 for U.S. Appl. No. 12/042,315.

Office Communication mailed Feb. 19, 2010 for U.S. Appl. No. 12/042,315.

Response to Office Communication filed Mar. 11, 2010 for U.S. Appl. No. 12/042,315.

Office Communication mailed Mar. 2, 2010 for U.S. Appl. No. 11/400,781.

* cited by examiner

ELECTRODE PROTECTION IN BOTH AQUEOUS AND NON-AQUEOUS ELECTROCHEMICAL CELLS, INCLUDING RECHARGEABLE LITHIUM BATTERIES

RELATED APPLICATIONS

This application claims priority under 35 U.S.C. §119(e) to U.S. Provisional Application Ser. No. 60/785,768, entitled, "Lithium/Water, Lithium/Air Batteries," filed on Mar. 22, 2006.

FIELD OF INVENTION

The present invention relates to electrode protection in electrochemical cells, and more specifically, to electrode protection in both aqueous and non-aqueous electrochemical cells including rechargeable lithium batteries.

BACKGROUND

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells.

Lithium battery systems generally include a cathode which is electrochemically lithiated during the discharge. In this process, lithium metal is converted to lithium ion and transported through electrolyte to the battery's cathode where it is reduced. In a lithium/sulfur battery, lithium ion forms one of a variety of lithium sulfur compounds, at the cathode. Upon charging, the process is reversed, and lithium metal is plated, from lithium ion in the electrolyte, at the anode. In each discharge cycle, a significant number (e.g., 15-30%) of available Li may be electrochemically dissolved in the electrolyte, and nearly this amount can be re-plated at the anode upon charge. Typically, slightly less lithium is re-plated at the anode at each charge, as compared to the amount removed during each discharge; a small fraction of the metallic Li anode typically is lost to insoluble electrochemically inactive species during each charge-discharge cycle.

This process is stressful to the anode in many ways, and can lead to premature depletion of Li and reduction of the battery cycle life. During this cycling, the Li anode surface can become roughened (which can increase the rate of field-driven corrosion) and Li surface roughening can increase proportionally to the current density. Many of the inactive reaction products associated with overall Li loss from the anode upon cycling can also accumulate on the increasingly roughened Li surface and may interfere with charge transport to the underlying metallic Li anode. In the absence of other degradation processes in other parts of the battery, the per-cycle Li anode loss alone can eventually render the cell inactive. Accordingly, it is desirable to minimize or inhibit Li-loss reactions, minimize the Li surface roughness/corrosion rate, and prevent any inactive corrosion reaction products from interfering with charge transport across the Li anode surface. Especially at higher current density (which is commercially desirable) these processes can lead to quicker cell death.

The separation of a lithium anode from the electrolyte of a rechargeable lithium battery or other electrochemical cell can be desirable for a variety of reasons, including the prevention of dendrite formation during recharging, reaction of lithium with the electrolyte, and cycle life. For example, reaction of a lithium anode with the electrolyte may result in the formation of resistive film barriers on the anode, which can increase the internal resistance of the battery and lower the amount of current capable of being supplied by the battery at the rated voltage. Many different solutions have been proposed for the protection of lithium anodes in such devices, including coating the lithium anode with interfacial or protective layers formed from polymers, ceramics, or glasses, the important characteristic of such interfacial or protective layers being to conduct lithium ions. For example, U.S. Pat. Nos. 5,460,905 and 5,462,566 to Skotheim describe a film of an n-doped conjugated polymer interposed between the alkali metal anode and the electrolyte. U.S. Pat. No. 5,648,187 to Skotheim and U.S. Pat. No. 5,961,672 to Skotheim et al. describe an electrically conducting crosslinked polymer film interposed between the lithium anode and the electrolyte, and methods of making the same, where the crosslinked polymer film is capable of transmitting lithium ions. U.S. Pat. No. 5,314,765 to Bates describes a thin layer of a lithium ion conducting ceramic coating between the anode and the electrolyte. Yet further examples of interfacial films for lithium containing anodes are described, for example, in U.S. Pat. Nos. 5,387,497 and 5,487,959 to Koksbang; U.S. Pat. No. 4,917,975 to De Jonghe et al.; U.S. Pat. No. 5,434,021 to Fauteux et al.; and U.S. Pat. No. 5,824,434 to Kawakami et al.

A single protective layer of an alkali ion conducting glassy or amorphous material for alkali metal anodes, for example, lithium anodes in lithium-sulfur cells, is described in U.S. Pat. No. 6,02,094 to Visco et al. to address the problem of short cycle life.

While a variety of techniques and components for protection of lithium and other alkali metal anodes are known, especially in rechargeable batteries, these protective coatings present particular challenges. Since lithium batteries function by removal and re-plating of lithium from a lithium anode in each charge/discharge cycle, lithium ion must be able to pass through any protective coating. The coating must also be able to withstand morphological changes as material is removed and re-plated at the anode.

Rechargeable (secondary) lithium batteries present a particular challenge in connection with their use with aqueous electrolytes. Water, and hydrogen ions, are particularly reactive with lithium. Such devices, to be successful in achieving long cycle life, will require very good protection of the lithium anode.

Despite the various approaches proposed for forming lithium anodes and forming interfacial and/or protective layers, improvements are needed, especially for lithium anodes designed for use in aqueous and/or air environments.

SUMMARY OF THE INVENTION

Electrode protection in electrochemical cells, and more specifically, electrode protection in both aqueous and non-aqueous electrochemical cells, including rechargeable lithium batteries, are presented.

In one aspect, an electrochemical cells is provided. The electrochemical cell comprises an electrode comprising a base electrode material comprising an active electrode species that is depleted and replated upon discharge and charge, respectively, of the electrode. The electrode comprises a first layer comprising the active electrode species, a second layer comprising the active electrode species, and a single-ion conductive layer separating the first layer from the second layer and substantially preventing electronic communication between the first and second layers across the layer. The second layer is positioned so as to reside between the first layer and an electrolyte used with the cell.

In another aspect, a method of electrical energy storage and use is provided. The method comprises providing an electrochemical cell comprising an electrode comprising a base electrode material comprising an active electrode species that is depleted and replated upon discharge and charge, respectively, of the electrode, wherein the electrode comprises a first layer comprising the active electrode species, a second layer comprising the active electrode species, a single-ion conductive layer separating the first layer from the second layer and substantially preventing electronic communication between the first and second layers across the single-ion conductive layer, wherein the second layer is positioned between the first layer and an electrolyte used with the cell. The method also comprises alternately discharging current from the device to define an at least partially discharged device, and at least partially charging said at least partially discharged device to define an at least partially recharged device, whereupon the base electrode material from the first layer is consumed upon discharge to a greater extent than it is replated upon charge, and base electrode material is replenished into the first layer, from the second layer, across the single-ion conductive, non-electronically conductive layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
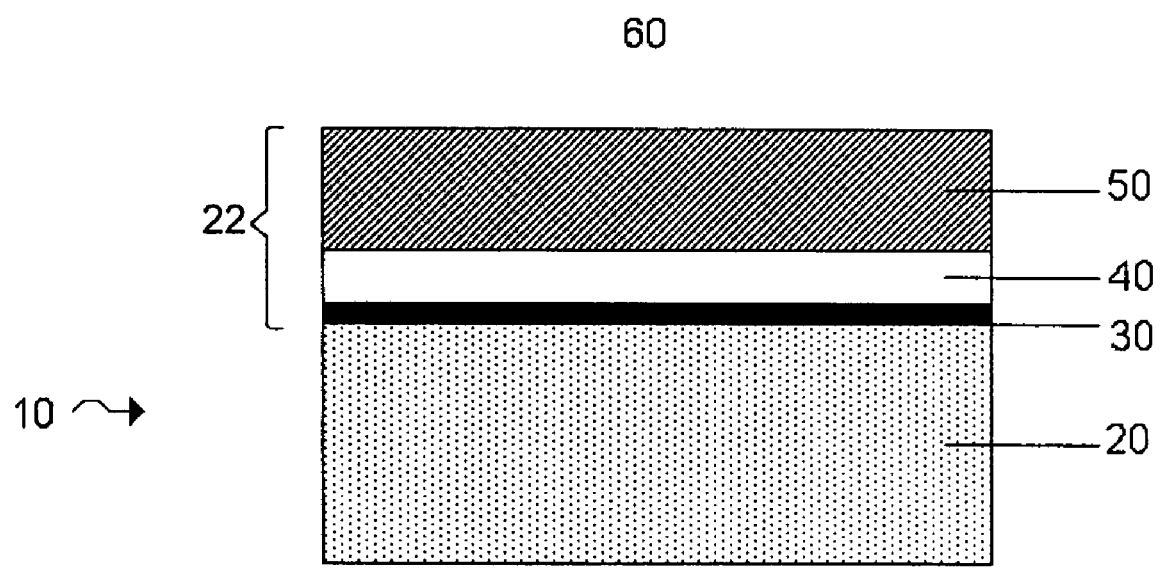
FIG. 1 shows a structure for use in an electrochemical cell, including a single-ion conductive layer and a polymer layer, according to one embodiment of the invention.

The present invention relates to electrode protection in electrochemical cells, and more specifically, to electrode protection in both aqueous and non-aqueous electrochemical cells, including rechargeable lithium batteries. In most embodiments described herein, lithium rechargeable batteries (including lithium anodes) are described. However, wherever lithium batteries are described herein, it is to be understood that any analogous alkali metal battery (alkali metal anode) can be used. Additionally, although rechargeable batteries are primarily disclosed herein, non-rechargeable (primary) batteries are intended to benefit from the invention as well. Furthermore, although the invention is particularly useful in providing anode protection, such that high-cycle life aqueous rechargeable batteries (batteries using an aqueous-based electrolyte) are enabled, the invention is also applicable to non-aqueous-based electrolyte batteries.

The invention provides techniques and components for superior protection of and/or maintenance of electrodes (especially lithium anodes) in rechargeable and other batteries. Components of the invention provide, at least, one or more of the following features: (1) protection of an electrode from one or more components of an electrolyte that can react with or otherwise hasten the demise of (shorten the cycle life of) the electrode and/or overall device, (2) control over dissolution of anode material into electrolyte (e.g., reduction of lithium to lithium ion), and re-plating of electrode material from the electrolyte (e.g., oxidation of lithium ion to lithium metal), at the anode, and/or (3) superior control of desirable passage of components from the electrode to the electrolyte (e.g., lithium ion) while inhibiting passage of undesirable components from the electrolyte to the electrode that can damage the electrode.

In one embodiment, an electrochemical cell of the invention includes an anode comprising lithium, and a multi-layered structure positioned between the anode and an electrolyte of the cell. In one specific embodiment providing superior interaction between the multi-layered structure and the electrode, the multi-layered structure includes at least a first single-ion conductive material layer (e.g., a lithiated metal layer), and at least a first polymeric layer positioned between the anode and the single-ion conductive material. In this embodiment, the multi-layered structure can include several sets of alternating single-ion conductive material layers and polymeric layers. The multi-layered structures can allow passage of lithium ions, while limiting passage of certain chemical species that may adversely affect the anode (e.g., water). The cells may also include an separation layer (e.g., a plasma-treated layer) positioned between the anode and the multi-layered structure. This separation layer can act as a temporary or permanent protective layer, e.g., to cause uniform depletion and/or re-plating of lithium across the surface of the anode.

As noted in the embodiment thus far described, a lithium electrode, with or without a separation layer, is first directly addressed by a polymeric layer. On the side of the polymeric layer opposite that of the electrode, a single-ion conductive material layer is provided. Additional layers can be further provided. This arrangement can provide significant advantage, as polymers can be selected that impart flexibility to the system where it can be needed most, namely, at the surface of the electrode where morphological changes occur upon charge and discharge. In one specific embodiment, the polymer is particularly pliable and/or elastic (non-brittle) to provide a particularly durable, robust, rechargeable battery. In this arrangement the polymer can have at least one of the following properties, or a combination of any number of these properties: a Shore A hardness of less than 100, less than 80, less than 60, less than 40, or less than 20, (or a Shore A hardness between 0 and 10, between 10 and 20, between 20 and 30, between 30 and 40, between 40 and 50, between 50 and 60, between 60 and 70, between 70 and 80, between 80 and 90, or between 90 and 100), or a Shore D hardness of less than 100, less than 80, less than 60, less than 40, or less than 20 (or a Shore D hardness between 0 and 10, between 10 and 20, between 20 and 30, between 30 and 40, between 40 and 50, between 50 and 60, between 60 and 70, between 70 and 80, between 80 and 90, or between 90 and 100); a Young's Modulus (elastic modulus) of less than 10 GPa, less than 5 GPa, less than 3 GPa, less than 1 GPa, less than 0.1 GPa, or less than 0.01 GPa (or a Young's Modulus between 0.01 and 0.1 GPa, between 0.1 and 1 GPa, between 1 and 2.5 GPa, between 2.5 and 5 GPa); and an average fracture toughness of greater than 0.1 $MN/m^3$, greater than 0.5 $MN/m^3$, greater than 1.0 $MN/m^{3/2}$, greater than 2.0 $MN/m^{3/2}$, greater than 3.0 $MN/m^{3/2}$, or greater than 5 $MN/m^{3/2}$ (e.g., as measured at room temperature and atmospheric pressure). Appropriate polymers may also be chosen based on one or more properties relevant to use in an environment as described herein, such as: glass transition temperature ($T_g$), melting point ($T_m$), strength (e.g., compressional, tensile, flexural, and yield strength), elongation, plasticity, and hardness (e.g., as measured by a Shore A or Shore D durometer, or the Rockwell hardness test). This arrangement, comprising a depletable/re-platable electrode, polymer protective layer, and single-ion-conductive layer as a sub-combination of an overall protective structure or overall battery, adds significant advantage. In this and other arrangements, single-ion-conductive layers can be selected among those described herein and generally known in the art including glasses, lithiated metal layers, and the like.

Most single thin film materials, when deposited on the surface of a Li anode, do not have all of the necessary properties of passing Li ions, forcing a substantial amount of the Li surface to participate in current conduction, protecting the metallic Li anode against certain species (e.g., liquid electrolyte and/or polysulfides generated from a sulfur-based cathode) migrating from the cathode, and impeding high current density-induced surface damage. The present inventors have developed solutions to these problems through several embodiments of the invention, including the use of multi-layered anode stabilization layers (electrode stabilization), embedded Li layers (e.g., embodiments including a first Li layer, a Li conducting and electron insulating layer, and a second Li layer), and separation layers (e.g., plasma treated layers), as discussed in greater detail below.

FIG. 1 shows one example of an electrode protective arrangement of the invention, exemplified as a multi-layered anode stabilization layer structure. In the embodiment illustrated in FIG. 1, structure 10 includes anode 20 comprising a base electrode material (e.g., lithium), and multi-layered structure 22 covering the anode. In some cases herein, the anode is referred to as an "anode based material," "anode active material," or the like, and the anode along with any protective structures are referred to collectively as the "anode." All such descriptions are to be understood to form part of the invention. In this particular embodiment, multi-layered structure 22 includes single-ion conductive material 50, polymeric layer 40 positioned between the base electrode material and the single-ion-conductive material, and separation layer 30 (e.g., a layer resulting from plasma treatment of the electrode) positioned between the electrode and the polymeric layer. Multi-layered structures can allow passage of lithium ions and may impede the passage of other components that may otherwise damage the anode. Advantageously, multi-layered structures can reduce the number of defects and thereby force a substantial amount of the Li surface to participate in current conduction, impede high current density-induced surface damage, and/or act as an effective barrier to protect the anode from certain species (e.g., electrolyte and/or polysulfides), as discussed in greater detail below.

Anode 20 can comprise a base electrode material such as lithium metal, which can serve as the anode active material. The lithium metal may be in the form of, e.g., a lithium metal foil or a thin lithium film that has been deposited on a substrate, as described below. The lithium metal may also be in the form of a lithium alloy such as, for example, a lithium-tin alloy or a lithium aluminum alloy.

In this and other embodiments, the thickness of the anode may vary from, e.g., about 2 to 200 microns. For instance, the anode may have a thickness of less than 200 microns, less than 100 microns, less than 50 microns, less than 25 microns, less than 10 microns, or less than 5 microns. The choice of the thickness may depend on cell design parameters such as the excess amount of lithium desired, cycle life, and the thickness of the cathode electrode. In one embodiment, the thickness of the anode active layer is in the range of about 2 to 100 microns. In another embodiment, the thickness of the anode is in the range of about 5 to 50 microns. In another embodiment, the thickness of the anode is in the range of about 5 to 25 microns. In yet another embodiment, the thickness of the anode is in the range of about 10 to 25 microns.

The device illustrated in FIG. 1. may further comprise a substrate, as is known in the art, on the surface of the anode opposite that of the multi-layer structure. Substrates are useful as a support on which to deposit the anode active material, and may provide additional stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, described more fully below, the substrate may be selected from non-electrically-conductive materials.

The layers of the anode structure 10 of the present invention may be deposited by any of a variety of methods generally known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Deposition of the layers may be carried out in a vacuum or inert atmosphere to minimize side reactions in the deposited layers which could introduce impurities into the layers or which may affect the desired morphology of the layers. In some embodiments, anode active layers and the layers of multi-layered structures are deposited in a continuous fashion in a multistage deposition apparatus.

Specifically, methods for depositing anode 20 (e.g., in the case of an alkali metal anode such as lithium) onto a substrate include methods such as thermal evaporation, sputtering, jet vapor deposition, and laser ablation. Alternatively, where the anode comprises a lithium foil, or a lithium foil and a substrate, these can be laminated together by a lamination process as known in the art, to form an anode layer.

In some embodiments, the single-ion conductive material is non-polymeric. E.g., in certain embodiments, the single-ion conductive material 50 is defined in part or in whole by a metal layer that is highly conductive toward lithium and minimally conductive toward electrons. In other words, the single-ion conductive material may be one selected to allow lithium ions, but to impede electrons, from passing across the layer. The metal layer may comprise a metal alloy layer, e.g., a lithiated metal layer especially in the case where a lithium anode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the single-ion conductive material include, but are not limited to, Al, Zn, Mg, Ag, Pb, Cd, Bi, Ga, In, Ge, Sb, As, and Sn. Sometimes, a combination of metals, such as the ones listed above, may be used in a single-ion conductive material.

In other embodiments, the single-ion conductive material may include a ceramic layer, for example, a single ion conducting glass conductive to lithium ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Single-ion conductive layers may include glassy layers comprising a glassy material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In one embodiment, the single-ion conductive layer comprises a lithium phosphorus oxynitride in the form of an electrolyte. Electrolyte films of lithium phosphorus oxynitride suitable for use as the single ion conductive material 50 are disclosed, for example, in U.S. Pat. No. 5,569,520 to Bates. The selection of the single ion conducting material will be dependent on a number of factors including, but not limited to, the properties of electrolyte and cathode used in the cell.

For cells used in a water and/or air environment, such as a rechargeable battery with an aqueous-based electrolyte, the single-ion conductive material may be constructed so as to impede the passage of hydrogen ions (protons) across its layer. For instance, during discharge protons may move against the electric field in a protective layer (e.g., a multi-layered structure) of a cell. However, during charge, the electric field may accelerate the penetration of protons across the protective layer. Eventually protons may reach a Li anode layer and generate, e.g., hydrogen gas or other species, which may form bubbles and can cause delamination, or other undesirable effects, in a multi-layered structure. As discussed in more detail below, the single-ion conductive layer may be combined with other materials (e.g., impregnated with a polymer) to impede the passage of hydrogen ions and/or or electrons, while permitting the passage of lithium ions.

The thickness of a single-ion conductive material layer (e.g., within a multi-layered structure) may vary over a range from about 1 nm to about 10 microns. For instance, the thickness of the single-ion conductive material layer may be between 1-10 nm thick, between 10-100 nm thick, between 100-1000 nm thick, between 1-5 microns thick, or between 5-10 microns thick. The thickness of a single-ion conductive material layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In some cases, the single-ion conductive layer has the same thickness as a polymer layer in a multi-layered structure.

The single-ion conductive layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, single-ion conducting layers can be treated with a polymer such that pinholes and/or nanopores of the single-ion conducting layers may be filled with the polymer. Such embodiments can impede the diffusion of certain species (e.g., electrolyte and/or polysulfides) towards the anode, e.g., by increasing the distance, and tortuosity, through which such a species would need to pass to penetrate the entire multi-layer arrangement to arrive at the anode, as discussed in greater detail below.

The thickness of a polymer layer (e.g., within a multi-layered structure) may vary over a range from about 0.1 microns to about 10 microns. For instance, the thickness of the polymer layer may be between 0.1-1 microns thick, between 1-5 microns thick, or between 5-10 microns thick. The thickness of a polymer layer may be no greater than, e.g., 10 microns thick, no greater than 5 microns thick, no greater than 2.5 microns thick, no greater than 1 micron thick, no greater than 0.5 microns thick, or no greater than 0.1 microns thick.

In some embodiments including a multi-layered structure having more than one polymer layer, the thicknesses of the polymer layers can vary within the structure. For instance, in some cases, the polymer layer closest to the anode layer (e.g., a Li reservoir) is thicker than the other polymer layers of the structure. This embodiment can, for example, stabilize the anode by allowing lithium ions to plate out more uniformly across the surface of the anode during charge.

A polymer layer may be deposited by method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. A method for depositing crosslinked polymer layers includes flash evaporation methods, for example, as described in U.S. Pat. No. 4,954,371 to Yializis. A method for depositing crosslinked polymer layers comprising lithium salts may include flash evaporation methods, for example, as described in U.S. Pat. No. 5,681,615 to Affinito et al. The technique used for depositing polymer layers may depend on the type of material being deposited, the thickness of the layer, etc.

As noted in the description with respect to FIG. 1 thus far, in one particular embodiment, the protective structure separating anode 20 from electrolyte 60 includes a polymer layer adjacent the anode (or separation layer) 30. In other arrangements, a polymer layer need not be the first layer adjacent the anode or separation layer. Various arrangements of the invention, including various multi-layered structures, are described below in which the first layer adjacent the anode may or may not be polymeric. It is to be understood that in all arrangements where any particular arrangement of layers is shown, alternate ordering of layers is within the scope of the invention. Notwithstanding this, one aspect of the invention includes the particular advantages realized by a non-brittle polymer immediately adjacent the anode or separation layer.

In some embodiments, multi-layered structures protect the anode better than any individual layer that is included in the structure. For instance, each of the layers of a multi-layered structure, e.g., the single-ion conducting layers, the polymer layers, or the separation layer, may possess desirable properties, but at the same time may be most effective when complemented by other components with different properties. For example, single-ion conducting layers, especially vacuum deposited single-ion conducting layers, may be flexible as thin films, but when deposited as thicker layers, may include defects such as pinholes and/or roughness, and may crack when handled. Polymer layers, and especially crosslinked polymer layers, for example, can provide very smooth surfaces, may add strength and flexibility, and may be electron insulating, but may pass certain solvents and/or liquid electrolytes. Accordingly, these are examples of layers that can complement each other in an overall improved protective structure.

Accordingly, in another embodiment, the invention provides a multi-layered electrode stabilization or protection structure that provides many advantages over existing electrode protective structures. In much of the description herein, the structure is referred to as an "anode stabilization" structure, but it is to be understood that the structure can be used for any electrode under suitable conditions as would be understood by those of ordinary skill in the art when taking into consideration the function of a particular electrode. Multi-layered electrode stabilization structures of the invention, according to this embodiment, are designed to minimize defects that might otherwise exist inherently in prior electrode protective structures, or that might exist inherently in electrode protective structures using the same or similar materials as those used in protective structures of the current invention, but arranged differently. For example, single ion-conductive layers (or other components of a device as described herein) may include pinholes, cracks and/or grain boundary defects. Once these defects are formed, they can grow/propagate through the entire thickness of the film as the film grows and may become worse as the film grows thicker. By separating thin single ion-conductive layers from each other with thin, pinhole free, smooth polymer layers, the defect structure in each single ion-conductive layer can be decoupled from the defect structure in every other single ion-conductive layer by an intervening polymer layer. Thus, at least one or more of the following advantages are realized in such a structure: (1) it is less likely for defects in one layer to be directly aligned with defects in another layer, and typically any defect in one layer is substantially non-aligned with a similar defect in another layer; (2) any defects in one single ion-conductive layer typically are much smaller and/or less detrimental than they would otherwise be in a thicker layer of otherwise similar or identical material. Where alternating single-ion conductive layers and polymer layers are deposited atop each other in a fabrication process, each single-ion conductive layer has a smooth, pinhole free, polymer surface upon which to grow. In contrast, where the single-ion conductive layer to be deposited atop another single-ion conductive layer (or continuously deposited as a single, thicker layer), defects in an underlying layer can serve to instigate defects in growth in a layer deposited atop an underlying layer. That is, whether a protective structure is built with thicker single-ion conductive layers or multiple single-ion conductive layers atop each other, defects can propagate through the thickness, or from layer to layer, as the structure grows, resulting in larger defects, and defects that propagate directly or substantially directly throughout the entire structure. In this arrangement, the single ion-conductive layers can also grow with fewer defects than would occur if they were deposited directly onto the rougher Li or electrolyte layers, particularly where the arrangement of FIG. 1 is employed in which the first electrode stabilization layer addressing the electrode is the polymer layer. Accordingly, in this arrangement, ion-conductive layers can be made that have overall fewer defects, defects that are not aligned with defects in nearest other ion-conductive layers and, where defects exist, they are typically significantly less detrimental (e.g., smaller) than would otherwise exist in a continuously-grown, thicker structure or layers of the same or similar material deposited on top of each other.

A multi-layered electrode stabilization structure can act as a superior permeation barrier by decreasing the direct flow of species (e.g., electrolyte and polysulfide species) to the Li anode, since these species have a tendency to diffuse through defects or open spaces in the layers. Consequently, dendrite formation, self discharge, and loss of cycle life can be reduced.

Another advantage of a multi-layered structure includes the mechanical properties of the structure. The positioning of a polymer layer adjacent a single-ion conductive layer can decrease the tendency of the single-ion conductive layer to crack, and can increase the barrier properties of the structure. Thus, these laminates may be more robust towards stress due to handling during the manufacturing process than structures without intervening polymer layers. In addition, a multi-layered structure can also have an increased tolerance of the volumetric changes that accompany the migration of lithium back and forth from the anode during the cycles of discharge and charge of the cell.

The ability of certain species that can be damaging to the anode (e.g., electrolytes and/or polysulfides) to reach the anode can also be decreased by providing repeated layers of single-ion conductive layers and polymer layers in a multi-layered structure. When a species encounters a defect-free portion of a single-ion conductive layer, transport of the species towards the anode is possible if the species diffuses laterally through a very thin polymer layer to encounter a defect in a second single-ion conductive layer. Since lateral diffusion through ultra-thin layers is very slow, as the number of single-ion conductive/polymer layer pairs increases, the rate of diffusion of species becomes extremely small (e.g., the amount of penetration across the layer decreases). For instance, in one embodiment, permeation of a species through polymer/single-ion conductive/polymer 3-layer structures can be reduced by three orders of magnitude over a single single-ion conductive layer alone (e.g., even though layers alone may have poor barrier properties). In another embodiment, a polymer/single-ion conductive/polymer/single-ion conductive/polymer 5-layer structure may have more than five orders of magnitude reduction of permeation of a species compared to that in a single single-ion conductive layer. By contrast, permeation of the same species through a double-thick single-ion conductive layer may actually increase. These significant reductions in permeation of destructive species through the electrode stabilization layer can increase as the number of layers increases where the thickness of individual layers decreases. That is, in comparison to a two-layer structure of a single-ion conductive layer and polymer layer of a particular, overall thickness, a ten-layer structure of alternating single-ion conductive layers and polymer layers of the same overall thickness can vary significantly decreased permeation of unwanted species through the layer. Specific arrangements are described below, and a principal involved in the increased barrier to passage of these species is schematically illustrated below in FIG. 6. Because of the significant advantage realized by electrode stabilization protection of the invention, overall lower amounts of material can be used in a particular protective structure, as compared to prior art structures. Accordingly, at a particular level of electrode protection needed in a particular battery arrangement, a significantly smaller mass of overall electrode stabilization materials can be employed, significantly reducing overall battery weight.

A multi-layered structure can include various numbers of polymer/single-ion conductive pairs as needed. Generally, a multi-layered structure can have n polymer/single-ion conductive pairs, where n can be determined based on a particular performance criteria for a cell. E.g., n can be an integer equal to or greater than 1, or equal to or greater than 2, 3, 4, 5, 6, 7, 10, 15, 20, 40, 60, 100, or 1000, etc. In some embodiments, a multi-layered structure can include greater than 4, greater than 10, greater than 25, greater than 50, greater than 100, greater than 200, greater than 500, greater than 1000, greater than 2000, greater than 3000, greater than 5000, or greater than 8000 polymer/single-ion conductive pairs. For example, in one particular embodiment, greater than 10,000 polymer/single-ion conductive pairs were fabricated.

Figure 2:
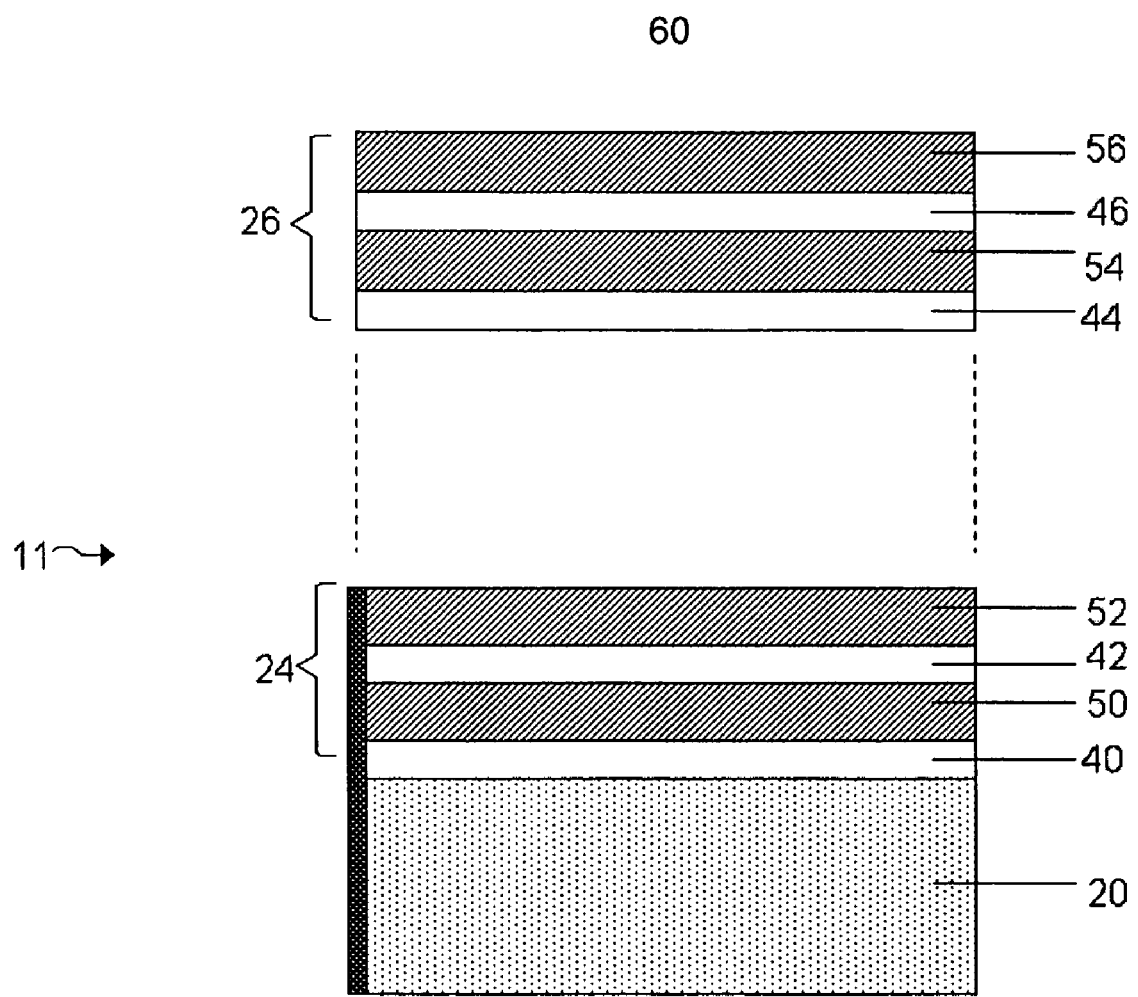
FIG. 2 shows a structure for use in an electrochemical cell, including several multi-layered structures, according to an embodiment of the invention.

FIG. 2 shows an example of a multi-layered electrode stabilization structure including multiple polymer and single-ion conductive layers. In the embodiment illustrated in FIG. 2, structure 11 includes anode 20 comprising a base electrode material (e.g., lithium), and multi-layered structure 24 positioned between the anode and an electrolyte 60 of the cell. The multi-layered structure comprises at least two first layers each of a single-ion conductive material and at least two second layers each of a polymeric material. For example, multi-layered structure 24 includes polymer layers 40 and 42, and single-ion conductive layers 50 and 52. As shown in FIG. 2, the two layers of polymeric material and two layers of single-ion conductive material are arranged in alternating order with respect to each other. Structure 11 may optionally comprise a separation layer (e.g., a plasma treated layer) between the base electrode material and the polymeric layer (not shown in FIG. 2; illustrated in FIG. 1).

Structure 11 can also include additional multi-layered structures such as multi-layered structure 26, comprising polymer layers 44 and 46, and single-ion conductive layers 54 and 56. Multi-layered structures 24 and 26 can be combined to form a single multi-layered, or can be constructed together as one, unitary multi-layered structure, including four layers each of a single-ion conductive material and for layers each of a polymeric material. In other embodiments, structures can include other numbers of alternating single-ion conductive layers and polymer layers. For instance, a multi-layered structure may include n first layers each of a single-ion conductive material and n second layers each of a polymeric material, in alternating arrangement, where n is greater than or equal to 2. E.g., n may equal at least 2, 3, 4, 5, 6, or 7, 10, 15, 20, 40, 60, 100, etc.

In other embodiments, a multi-layered structure may include a greater number of polymer layers than single-ion conductive layers, or a greater number of single-ion conductive layers than polymer layers. For example, a multi-layered structure may include a n polymer layers and n+1 single-ion conductive layers, or n single-ion conductive layers and n+1 polymer layers, where n is greater than or equal to 2. E.g., n may equal 2, 3, 4, 5, 6, or 7, etc. However, as described above, it is immediately adjacent at least one polymer layer and, in at least 50%, 70%, 90%, or 95% of the ion-conductive layers, such layers are immediately adjacent a polymer layer on either side.

As mentioned, multi-layered electrode stabilization structures can provide significant advantage where a particular amount of materials defining the structure are arranged in thinner, and greater numbers of, form. In some embodiments, each layer of the multi-layered structure has a maximum thickness of less than 100 microns, less than 50 microns, less than 25 microns, less than 10 microns, less than 1 micron, less than 100 nanometers, less than 10 nanometers, or less than 1 nanometer. Sometimes, the thickness of a single type of layer may be the same in a multi-layered structure. For instance, polymer layers 40 and 42 may have the same thickness in multi-layered structure 24. In other embodiments, the thickness of a single type of layer may be different in a multi-layered structure, e.g., polymer layers 40 and 42 may have different thicknesses in multi-layered structure 24. The thicknesses of different types of layers in a multi-layered structure may be the same in some cases, or different in other cases. For example, the thicknesses of polymer layers 40 and 42 may be different than the thickness of single-ion conductive layers 50 and 52. Those of ordinary skill in the art can select appropriate materials and thicknesses of layers in combination with the description herein.

A multi-layered structure may have various overall thicknesses that can depend on, for example, the electrolyte, the cathode, or the particular use of the electrochemical cell. In some cases, a multi-layered structure can have an overall thickness of less than or equal to 1 cm, less than or equal to 5 mm, less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, or less than or equal to 50 microns. It may also be desirable to have a multi-layered structure having a certain thickness with a certain number of polymer/single-ion conductive material pairs. For instance, in one embodiment, a multi-layered structure may have a thickness of less than 1 mm, and may include greater than 10 polymer/single-ion conductive material pairs. In another embodiment, a multi-layered structure may have a thickness of less than 0.5 mm, and may include greater than 50 polymer/single-ion conductive material pairs. It is to be understood that a variety of embodiments are provided by the invention, each including specific combinations of overall electrode stabilization thickness, thicknesses of individual layers, numbers of individual layers, etc. as described herein.

As noted, multi-layered structures can protect the anode by decreasing water and/or oxygen penetration across the layers. For instance, a typical PVD oxide coating of a few hundred Angstroms thick on 12 micron thick PET surface can decrease water and/or oxygen permeation by a factor of 30-40 times compared to a surface without the PVD oxide coating. The water and/or oxygen permeation decrease resulting from a typical 1 micron thick acrylate coating (coated monomer that is subsequently polymerized) on a 12 μm thick PET surface may be barely measurable. However, applying the acrylate coating over the oxide layer in the PET/oxide structure can result in a further 10-20 fold decrease in water and/or oxygen permeation. Two polymer/oxide pairs can decrease water and/or oxygen permeation by more than 100 fold over a single PVD oxide coating, while 5 pairs can reduce oxygen permeation by more than 5 orders of magnitude. As such, electrochemical cells including multi-layered structures are well-suited for use in water and/or oxygen or air environments.

Figure 3:
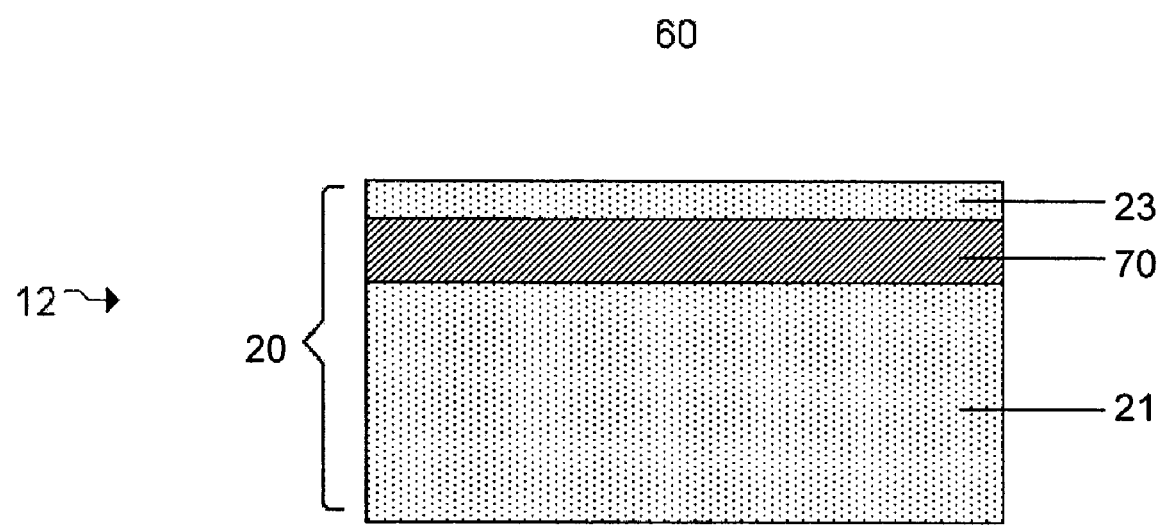
FIG. 3 shows a structure for use in an electrochemical cell, including an embedded layer, according to an embodiment of the invention.

Another embodiment of the invention includes an embedded layer (e.g., of a single-ion conductive material) positioned between two layers of base electrode materials. This is referred to as a "lamanode" structure. FIG. 3 shows structure 12 including anode 20 comprising a first layer of a base electrode material (e.g., lithium, also referred to as a Li reservoir), embedded layer 70, and a second layer 22 comprising the base electrode material (a working Li layer). As illustrated in the embodiment shown in FIG. 3, the second layer is positioned between the anode 20 and electrolyte 60. The second layer may be either in direct contact with the electrolyte, or in indirect contact with the electrolyte through some form of a surface layer (e.g., an electrode stabilization structure, for example, one described herein). The function of the bi-layer anode structure, with each anode portion separated by an imbedded layer 70, will become clearer from the description below. It is noted that although layer 70 is illustrated and described as "embedded" in this description, it is noted that the layer need not be partially or fully embedded. In many or most cases, layer 70 is a substantially thin, two-sided structure coated on each side by anode material, but not covered by anode material at its edges. In general, in operation of the arrangement shown in FIG. 3, some or all of second layer (portion) 23 of the anode is "lost" from the anode upon discharge (when it is converted to lithium ion which moves into the electrolyte). Upon charge, when lithium ion is plated as lithium metal onto the anode, it is plated as portion 23 (or at least some portion of portion 23) above layer 70. Those of ordinary skill in the art are aware that in batteries such as those described herein, there is a small amount of overall lithium loss on each charge/discharge cycle of the battery. In the arrangement illustrated in FIG. 3, the thickness of layer 23 (or the mass of layer 23) can be selected such that most or all of layer 23 is lost upon full discharge of the battery (full "satisfaction" of the cathode; the point at which the cathode can no longer participate in a charging process due to limitations that would be understood by those of ordinary skill in the art). Layer 70 is selected to be one that is conductive to lithium ions. The embedded layer can shield the bottom Li layer from damage as the high $Li^+$ flux of the first cycle damages the top Li layer surface. Accordingly, once all of layer 23 is consumed in a particular discharge cycle, further discharge results in oxidation of lithium from layer 21, passage of lithium ion through layer 70, and release of lithium ion into the electrolyte. Of course, layer 23 need not be of a particular mass such that all or nearly all of it is consumed on first discharge. It may take several discharge/charge cycles, and inherent small amount of lithium loss through each cycle, to result in the need to draw lithium from section 21 through layer 70 and into the electrolyte. But once that occurs, then each subsequent charge/discharge cycle will generally progress as follows.

Through most of the discharge cycle lithium will be removed from section 23 and, at the very end of the discharge cycle, a small amount of lithium will be required to be drawn from section 21 through layer 70 to make up for the amount of lithium lost in the most recent charge/discharge cycle. Upon charge, lithium will be plated upon layer 70 as material 23 in an amount very slightly less than that removed from the anode during discharge. The electrode stabilization layer 70 can be made of any suitable material selected, by those of ordinary skill in the art, in accordance with the function described herein. Generally, layer 70 will be made of a material that is single-ion conductive but that will not allow lithium metal itself to pass. In some embodiments the material is non-electrically-conductive, for reasons described below.

The ratio of the thickness of first and second layers of base electrode materials can be calculated based on, e.g., a required "depth of discharge" (amount of lithium metal consumed) of the first discharge. The ratio may be, for instance, between the range of 0.2 to 0.4. The thickness of anode 20 may be, for instance, less than 100 microns, less than 50 microns, less than 25 microns, or less than 10 microns. In some embodiments, anode 20 can have a thickness between 10 and 30 microns.

In some embodiments, embedded layer 70 may have a thickness between 0.01-1 microns, and may depend on, e.g., the type of material used to form the embedded layer and/or the method of depositing the material. For example, the thickness of the embedded layer may be between 0.01-0.1 microns, between 0.1-0.5 microns, or between 0.5-1 micron. In other embodiments, thicker embedded layers are included. For example, the embedded layer can have a thickness between 1-10 microns, between 10-50 microns, or between 50-100 microns. In some cases, the embedded material can be formed of a polymer, e.g., including ones listed above that are lithium ion conductive. The polymer film can be deposited using techniques such as vacuum based PML, VMT or PECVD techniques. In other cases, an embedded layer can comprise a metal or semi-conductor material. Metals and semi-conductors can be, for example, sputtered. Those of ordinary skill in the are can choose suitable materials, thicknesses, and methods of depositing embedded layers based on routine experimentation in combination with disclosure herein.

In one embodiment, layer 70 is an anode stabilization structure of multi-layer form as described above in connection with FIG. 2 and as described more fully below.

The second layer 23 of lithium can be used to protect the surface of anode 20 (e.g., a Li surface) by limiting the current density-induced surface damage to a thin Li layer above the embedded layer 70. For instance, layer 23 can lithiate the cathode (be removed from the anode in the form of lithium ion) on the first cycle, e.g., under extremely high Li⁺ flux, instead of causing anode 20 to lithiate the cathode, thereby protecting anode 20. In each charge/discharge cycle (after the point is reached at which more lithium than is present in layer 23 is removed from the anode during discharge) only a small amount of lithium is removed from section 21 and no lithium is re-plated at section 21. This can eliminate or reducing the numbers of defects, cracks, pinholes and/or dendrites forming on the surface of anode 20 during the cathode lithiation. Structure 12 can improve the cycle life of the cell compared to a cell including an anode without a second layer of Li and/or an embedded layer, as described in further detail below.

As mentioned, layer 70 should be able to pass lithium ions. It can be made of material including ceramic, glass, or polymer layer (or a multi-layered structure, as described below) that is conductive to Li ions and, in some embodiments, it substantially impedes the passage of electrons across the layer. By "substantially impedes", in this context, it is meant that in this embodiment the material allows lithium ion flux at least ten times greater than electron passage. As noted, in other embodiments the material can be electron conductive.

Referring again to FIG. 3, anode 12 can function with any of a variety of current collectors (not shown). Current collectors are well known to those of ordinary skill in the art and can be readily selected from suitable materials based upon this disclosure. In one arrangement, a current collector addresses the bottom surface of section 21 of anode 20 (the side opposite electrolyte 60). In another arrangement, an edge collector is used, which can be positioned on one or multiple edges, i.e., a side, as illustrated in FIG. 3, including section 21, material 70, and section 23. In other arrangements, both a bottom collector and one or more edge collectors can be used. Where only a bottom collector is used, material 70 should be electronically conductive as well as lithium ion conductive. Where an edge collector is used material 70 can be selected to substantially inhibit electron passage.

Figure 4:
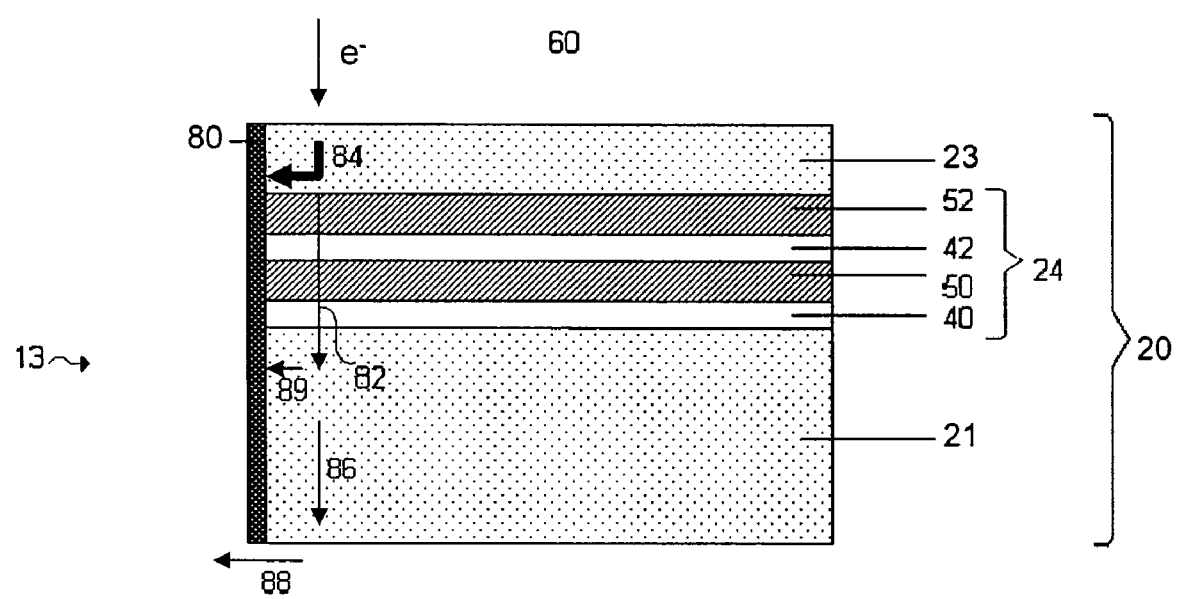
FIG. 4 shows a structure for use in an electrochemical cell, including an embedded layer comprising a multi-layered structure, according to an embodiment of the invention.

In one particular set of embodiments, an edge collector is used and provides advantage in anode stabilization/protection. One such arrangement is illustrated in FIG. 4, where an embedded stabilization structure 24 (itself analogous to section 70 of FIG. 3), separates the Li anode 20 into one portion 21, (the Li reservoir), from a second portion of Li, layer 23 (the working Li layer). The embedded layer, e.g., multi-layered structure 24, the Li reservoir, and layer 22 can all be electrically connected at the edge current collector 80. In the arrangement illustrated in FIG. 4, a bottom current collector is not used.

During operation of an electrochemical cell as illustrated in FIG. 4, or another cell including an embedded layer between two base electrode material layers and with an edge collector, during discharge, current enters the anode through the working Li/electrolyte interface. However, the embedded layer can substantially block electron current while allowing passage of Li ions. For instance, the flow of electron current, as illustrated by the arrows in FIG. 4, may be substantially impeded through the electrode stabilization layer, to section 21 of the anode, and to one or more current collectors. Thus, a substantial amount or substantially all of the current can pass through the working Li layer 23 to the edge collector 80, e.g., in the direction of arrow 84, while a much smaller portion (or essentially no electron flow) passes through stabilization material 24 to the Li reservoir 21 to the edge collector, e.g., in the direction of arrows 82 and 89, or to a bottom current collector (not shown) in the direction of arrows 86 and 88. As noted, in some embodiments, the working Li layer, prior to first discharge of the cell 23, comprises more active electrode species than is depleted upon full discharge of the counter electrode, e.g., as to satisfy the cathode upon cathode lithiation. E.g., the working Li layer may include an amount of Li, prior to first discharge of the cell, such that greater than 50%, greater than 70%, greater than 90%, or greater than 95% of the Li of the working layer 23 is electrochemically dissolved upon the first discharge.

On charging, lithium ion is plated, as lithium metal, at the anode, as described above in connection with FIG. 3. Since the electrolyte/working Li layer 23/edge collector 80 is the lowest resistance path for electron current, most current takes this path once Li ion reaches the working Li layer and is reduced. Current density induced damage/corrosion is significantly minimized since any such processes occur only or primarily at the electrolyte/working Li 23 interface, while the embedded layer 21 remains undamaged. As noted above in connection with FIG. 3, as the working Li layer gradually loses a small percentage of Li during each cycle, this Li is replaced by a flow of Li ions across the embedded layer 24 and into the electrolyte. This results in more even loss/re-plating of lithium during discharge/charge cycles, therefore minimizing damage/corrosion of the anode and, importantly, the damage/corrosion can be inhibited or made to be essentially zero in Li reservoir 21. As a result, the Li reservoir does not degenerate into isolated Li islands surrounded by corrosion byproducts, as can be the case with use of a single layer Li anode.

A variety of arrangements can be employed to encourage even plating of lithium at section 23 during charge. For example, although in the embodiment illustrated in FIG. 4 it can be advantageous to form layer 24 to be substantially non-electrically conductive overall, one or more layers of the structure can be made to be electrically conductive to define a current collector component. For example, in structure 24 one or more of the layers, for example layer 52 closest to section 23 and electrolyte 60, can be made somewhat or significantly electrically conductive. In this way, during charge, even deposition of the first very thin layer of lithium on the anode can be made to occur essentially evenly across structure 24. Once a portion of lithium has been deposited, then the electronic conductivity of lithium itself also facilitates further even deposition of material 23.

Structures such as those shown in FIGS. 3 and 4 may be used with primary or secondary cells. In some cases, a method of electrical energy storage and use may include alternately discharging current from the cell to define an at least partially discharged device, and at least partially charging said at least partially discharged device to define an at least partially recharged device. This discharge and charge may cause the base electrode material from a working Li layer (e.g., layer 23 of FIG. 4) to be consumed upon discharge to a greater extent than it is re-plated upon charge, which can cause the base electrode material to be replenished into the working Li layer, from the base anode layer (e.g., layer 21 of FIG. 4), across the embedded layer. Such cells can operate in the presence of an aqueous (e.g., water) or air electrolyte in electrochemical communication with the anode and cathode.

When a rechargeable lithium battery using an aqueous electrolyte, or other primary or secondary electrochemical device described herein or useful in connection with components of the invention, is constructed by those of ordinary skill in the art, one or many of the features described herein can be employed. For example, a device can include an electrode stabilization component 22 as shown in FIG. 1. In another arrangement a device can include a stabilization component 70 as illustrated in FIG. 3. In another arrangement a multi-layered electrode stabilization structure, such as described in connection with FIG. 2, can be used as shown in FIG. 4 in combination with one or more of hydrophobic materials inhibiting passage of water and/or a basic (pH greater than 7.1, or higher) aqueous electrolyte. Combinations or one or more of these structures can result in a significantly robust aqueous-based lithium rechargeable battery, and the battery may also be compact and/or light weight (e.g., the total thickness of the layers between and including the anode and an outer layer may be less than 1 cm, less than 0.5 cm, less than 1 mm, less than 700 microns, less than 500 microns, less than 300 microns, less than 250 microns, less than 200 microns, less than 150 microns, less than 100 microns, less than 75 microns, less than 50 microns, or less than 10 microns). As such, the invention enables a method of electrical energy storage and use including providing an electrochemical cell comprising an anode with lithium as the active anode material, a cathode, and an aqueous electrolyte in electrochemical communication with the anode and cathode, and cycling the cell, by alternately discharging and charging the cell, at least n times wherein, at the end of the nth cycle, the cell exhibits at least 80% of the cell's initial capacity, where n= at least 3, 5, 10, 15, 25, 50, 100, 150, 200, or 250 or more. As noted, the invention can be used to enhance the lifetime of rechargeable lithium batteries employing aqueous-based electrolytes. As used herein, "aqueous-based electrolyte" means an electrolyte including at least 20%, by weight, water, and more typically at least 50%, 70%, 80%, or 95% or more water by weight. Several additional features are included in the invention to assist function in a rechargeable battery useful in an aqueous environment, or an environment exposed to air. In the case of an aqueous-based electrolyte, in one set of embodiments the electrolyte is formulated so as to have a pH of at least 7.1, and in other embodiments at least 7.2, 7.3. 7.4., 7.5, 7.6, 7.7, or 7.8 providing an electrolyte in basic form such as this inherently significantly reduces the presence of hydrogen ion which can be destructive if exposed to a lithium or other alkali metal electrode. In some embodiments, the electrolyte may have a pH between 7-8, between 8-9, between 9-10, between 10-11, or between 11-12 prior to the first discharge.

Formulating an electrolyte in basic form can be carried out by those of ordinary skill in the art, without undue experimentation, while providing the electrolyte with the ability to function effectively in the device and not causing inhibitory or other destructive behavior. Suitable basic species that may be added to an aqueous-based electrolyte, employed with a lithium battery, to achieve a basic pH as noted above may depend on, for example, the specific components of the lithium battery, the environment of use (e.g., an air/oxygen or water environment), the method of using the battery (e.g., a primary or secondary battery), etc. Suitable basic species may also be chosen based on the basicity (e.g., pH) of the species, the diffusivity of the species, and/or the likelihood of the species reacting with the electrolyte, other components in the electrolyte, components of the anode (e.g., polymer layers, single ion conductive layers, and anode layers), and/or the cathode material. Typically, chemical reaction between the basic species and such components of the battery are avoided. Accordingly, those of ordinary skill in the art can choose an appropriate basic species by, e.g., knowing the components of the battery and the likelihood of reactivity between the species and the components, and/or by a simple screening test. One simple screening test may include adding the species to the electrolyte in the presence of a material component of the cell, e.g., a single-ion conductive material, and determining whether the species reacts and/or negatively effects the material. Another simple screening test may include adding the species to the electrolyte of the battery in the presence of the battery components, discharging/charging the battery, and observing whether inhibitory or other destructive behavior occurs compared to that in a control system. Other simple tests can be conducted by those of ordinary skill in the art.

Species that may be added to an aqueous-based electrolyte, employed with a lithium battery, to achieve a basic pH as noted above include bases comprising alkali and alkali earth metals (Group 1 and 2 metals, respectively), as well as ammonium-containing species (e.g., ammonium hydroxides, carbonates, and sulfides). Specific examples of species that can be added to an aqueous-based electrolyte to achieve a basic pH include, but are not limited to, ammonia, aniline, methylamine, ethylamine, pyridine, calcium carbonate, calcium hydroxide, ferrous hydroxide, potassium acetate, potassium bicarbonate, potassium carbonate, potassium cyanide, potassium hydroxide, sodium acetate, sodium benzoate, sodium bicarbonate, sodium carbonate, sodium hydroxide, sodium metasilicate, sodium sesquicarbonate, sodium phosphate, sodium hydrogen phosphate, sodium sulfite, sodium cyanide, trisodium phosphate, magnesium hydroxide, barium hydroxide, calcium hydroxide, lithium hydroxide, rubidium hydroxide, cesium hydroxide, and strontium hydroxide. It is routine for those of ordinary skill in the art to determine the amount of such an additive needed to create an electrolyte of desired pH.

In another arrangement suitable for maximizing the effectiveness of an alkali metal electrode-containing device used in combination with an aqueous-based electrolyte, especially a rechargeable battery, the electrode stabilization/protective component (e.g., as illustrated in FIGS. 1 and 2, and optionally FIGS. 3 and 4) can be made to be substantially impermeable to water. This can be done by selecting one or more materials that are sufficiently hydrophobic or otherwise impede water transport. This concept will be described, by way of example only, with reference to FIG. 2. In FIG. 2, one effective device will include a top layer (layer 56 as illustrated) that is significantly hydrophobic so as to prevent water passage. In another arrangement, an intermediate layer (e.g., 44, 52, 42, etc.) can be made sufficiently hydrophobic to block water passage. In another arrangement, none of the layers individually is sufficiently hydrophobic or otherwise formulated to substantially prevent water passage but, together the layers substantially prevent water passage. For example, each layer, or some combination or subcombination of layers, can be made somewhat hydrophobic so that each repels water to some extent. In this arrangement, the combination of the layers can be formulated and/or selected to substantially prevent water passage overall. One measure of hydrophobicity that can be useful in selecting such materials is contact angle measurements taken between water and a candidate material. While "hydrophobic" can be considered a relative term in some cases, a particular degree or amount of hydrophobicity can be easily selected by those of ordinary skill in the art, with the aid of knowledge of the characteristics of particular materials and/or readily-determined contact angle measurements to select materials for construction of an anode stabilization structure which, overall, impedes water passage significantly. "Significantly" in this context, can mean that where an aqueous electrolyte is used, after 100 cycles of a rechargeable device employing the stabilization component water will be completely absent from the electrode under the stabilization component (the side opposite the electrolyte) or, if present, will be present in an amount less than 100 parts per million measured to include all molecular species at that location. In other embodiments, water will be present in an amount less than 75 ppm, less than 50, 25, 10, 5, or 2 ppm.

A variety of materials and arrangements can be used in individual assemblies described and illustrated herein, or in all of the assemblies. It is to be understood that where a particular component or arrangement is described in connection with one embodiment or figure, that component or arrangement can be used in connection with any others. One example of such a structure is a separation layer, e.g., a temporary protective material layer or a plasma $CO_2$ treatment layer, positioned between the an anode layer and a polymer layer or a multi-layered structure. For example, in the embodiments shown in FIG. 1, layer 30 is a separation layer. It is to be understood that where a separation layer 30 is used, the first layer adjacent the separation layer opposite the electrode is described herein at times to be adjacent the electrode. This is because the separation layer is optional. In all instances in which a layer is described as being adjacent, or immediately adjacent an electrode (for example the polymer layer 40 of FIG. 1), an intervening separation layer can be used but need not be used. Separation layers may improve the compatibility of the base electrode material (e.g., lithium) with layers deposited on top of the electrode. For example, when a single-ion conductive layer is desired at the lithium interface, it is preferable to deposit this directly on the lithium surface. However, the precursors to, or components of, such an interfacial layer may react with lithium to produce undesirable by-products or result in undesirable changes in the morphology of the layers. By depositing a separation layer on the lithium surface prior to depositing the interfacial layer such as a multi-layer structure 24 (FIG. 2), side reactions at the lithium surface may be eliminated or significantly reduced. For example, when an interfacial film of a lithium phosphorus oxynitride, as described in U.S. Pat. No. 5,314,765 to Bates, is deposited in a nitrogen atmosphere by sputtering of $Li_3PO_4$ onto a lithium surface, the nitrogen gas may react with lithium to form lithium nitride ($LiN_3$) at the anode surface. By depositing a layer of a protective material that can be "temporary", e.g., copper over the lithium surface, the interfacial layer may be formed without the formation of lithium nitride. A "temporary" protective layer is one that ceases to be in existence or identifiable after some time after construction of the device, for example after some period of use of the device. For example, a thin layer of copper 30 positioned over a lithium anode 20 (described in the context of FIG. 1) will diffuse into an alloy with the anode until, after a particular period of time and/or use of the device, anode 20 will be primarily lithium, with a trace of copper, but layer 30 will no longer exist or be identifiable.

A temporary protective material layer may include a material that is capable of forming an alloy with lithium metal, or is capable of diffusing into, dissolving into, and/or blending with lithium metal, e.g., during electrochemical cycling of the cell and/or prior to electrochemical cycling of the cell. The temporary protective material layer can act as a barrier layer to protect the lithium surface during deposition of other layers, such as during the deposition of a multi-layered structure on top of the anode. Further, the temporary protective layer may allow transportation of the lithium films from one processing station to the next without undesirable reactions occurring at the lithium surface during assembly of cells, or for solvent coating of layers onto the anode.

The thickness of the temporary protective material layer is selected to provide the necessary protection to the layer comprising lithium, for example, during subsequent treatments to deposit other anode or cell layers. In some embodiments, it is desirable to keep the layer thickness as thin as possible while providing the desired degree of protection so as to not add excess amounts of non-active materials to the cell which would increase the weight of the cell and reduce its energy density. In one embodiment, the thickness of the temporary protective layer is between 5 to 500 nanometers, e.g., between 20 to 200 nanometers, between 50 to 200 nanometers, or between 100 to 150 nanometers.

Suitable materials that can be used as temporary protective material layers include metals such as copper, magnesium, aluminum, silver, gold, lead, cadmium, bismuth, indium, gallium, germanium, zinc, tin, and platinum.

In some cases, protective structure 30 can include plasma treated layers such as $CO_2$ or $SO_2$ induced layers. Plasma treated layers can allow nearly the entire anode surface area to participate in the current carrying process. In other words, plasma treated layers may allow uniform current density across a surface and decreases the amount of pitting on a surface. In some cases, these treatments alone routinely increase cycle life by 15% to 35% because more of the Li is available for use during discharge. The plasma surface treatments can make more of the Li available to be cycled by creating a surface that is substantially homogeneous in topography.

Figure 5:
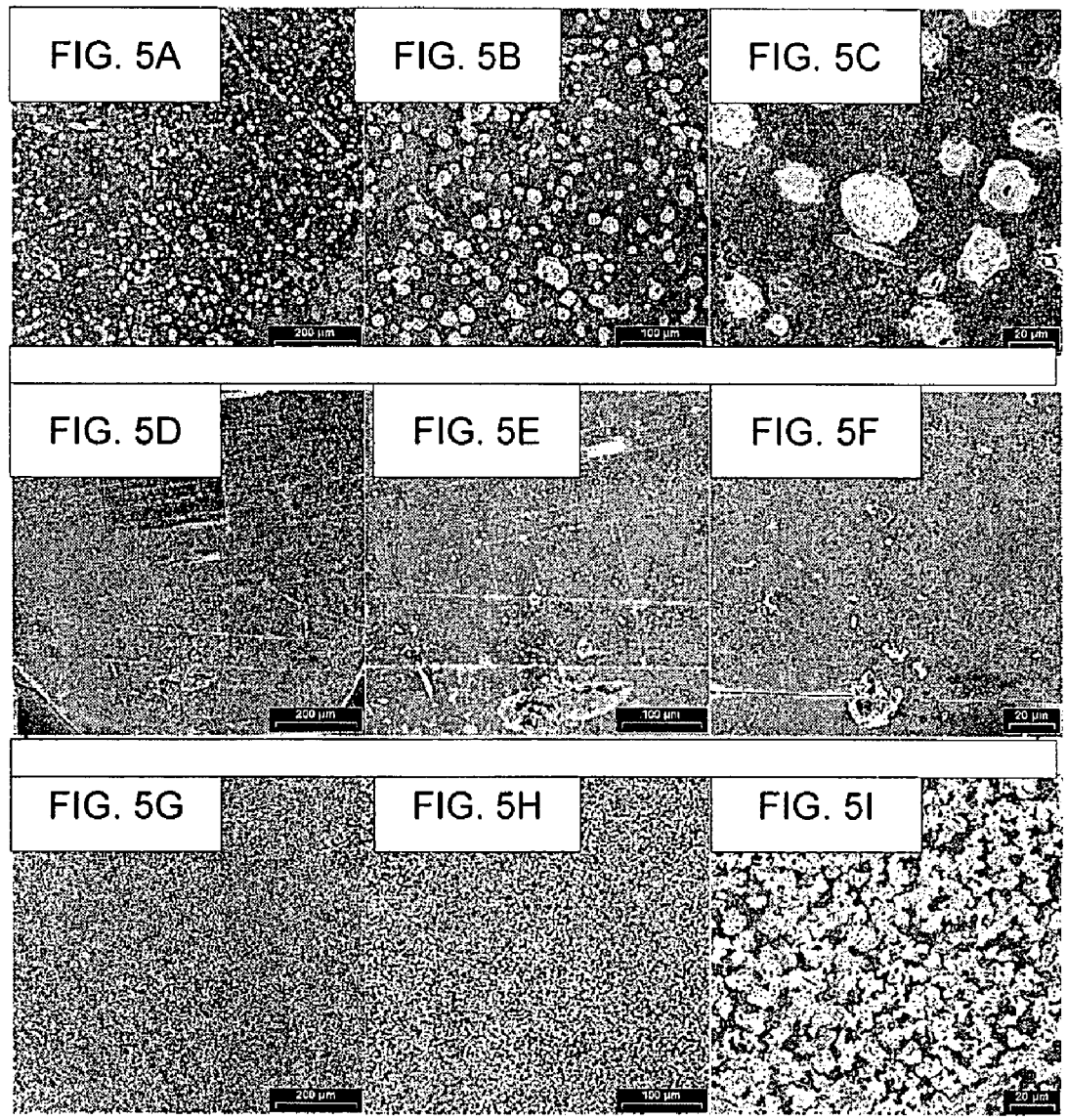
FIG. 5 shows SEM images of Li anode surfaces after a $10^{th}$ discharge, according to an embodiment of the invention.

FIG. 5 illustrates the results of one comparative experiment showing the benefits of a temporary protective layer 30, which can be used in combination with any or all other features of the invention. FIG. 5 shows SEM images of Li anode surfaces after a $10^{th}$ discharge. FIGS. 5A-5C show images of a Li anode alone without plasma treatment through progressive use of the device. The spots are areas where Li has been corroded from the surface. FIGS. 5D-5F show anode surfaces treated with a layer of LiPON through progressive use, comparative to FIGS. 5A-5C. With these surfaces, the Li only corrodes under defects in the LiPON coating. FIGS. 5G-5I show anode surfaces that have been treated with a $CO_2$ plasma, again through progressive use comparative to that of FIGS. 5A-5C and FIGS. 5D-5F. These images show that a substantial portion of the anode surface was utilized during discharge, indicating lower current discharge density across the surface and increased cycle life.

Another example of a structure that can be used in connection with several embodiments of the invention include single-ion conductive layers (e.g., as part of a multi-layered structure) that are treated with a transport-inhibiting substance which can be a polymer or other species such that any nanopores and/or pinholes of the single-ion conductive layer are at least partially filled with the polymer. This filling creates an infiltrated porous barrier (IPBM), which can increase the barrier properties of the layer by decreasing the rate of transport of certain species (e.g., electrolyte, water, and oxygen) towards the anode.

Advantageously, the filled single-ion conductive layer can have a combination of low permeability and high flexibility, due to the resultant network of infiltrating transport-inhibiting substance. The higher elastic modulus of such a species, when a polymer is selected, relative to the brittle compounds that may be used for the single-ion conductive layer can provide flexibility in the IPBM, as well as a resistance to fracture, that is not possible with certain single-ion conductive materials. Polymers having physical characteristics as described elsewhere herein can be used for such infiltrating species. This flexibility without fracture may improve adhesion between the infiltrated polymer and the internal surfaces of the single-ion conductive material is increased due to the high surface energy of the single-ion conductive material prior to infiltration.

In one embodiment, a single-ion conductive layer is infiltrated with a monomeric precursor of the transport-inhibiting substance, so that the porous structure is effectively filled with the monomer, the monomer being driven into the nanoporous regions of the porous single-ion conductive layer by the high surface energy present on the single-ion conductive layer's internal surfaces. The single-ion conductive material may be treated with an activation process before treatment with the monomer, so that surface energy within the material becomes unusually high, relative to that achievable in normal atmospheric processes.

In some instances, monomer vapor can be condensed onto the single-ion conductive material layer, whereby it is then able to wick along the internal surfaces of the single-ion conductive material layer, until all, or some useful portion of, such available tortuous by-paths of permeation are filled by the monomer. A subsequent curing step, either photo-initiated techniques, plasma treatment, or an electron beam, can then be introduced for polymerization of the infiltrated monomer. The particular cure method utilized will depend on the specific choice of materials and the layer thickness, amongst other variables.

Suitable material used as the transport-inhibiting substance includes material known to fully or partially inhibit (or determined to inhibit through simple screening) transport of a particular unwanted species through the material. As mentioned, material may also be selected according to physical properties, including properties adding flexibility and/or strength to the overall material with which it is combined. Specific examples of materials include, as noted, polymers described herein for use as layers in the multi-layered structure, and/or other polymeric or other species. Where hydrophobicity is desirably added to the overall arrangement, one way to do so is to use an infiltrating transport-inhibiting substance having some degree of hydrophobic character.

Formation of IPBM-type structures may be accomplished by a variety of means; however, in some embodiments, the IPBM is formed by vacuum vapor deposition methods and apparatus readily available in prior art manufacturing processes. Accordingly, an IPBM may be formed utilizing a variety of prior art vapor sources for the IPBM material. The inorganic vapor source may comprise any appropriate source of the prior art, including but not limited to sputtering, evaporation, electron-beam evaporation, chemical vapor deposition (CVD), plasma-assisted CVD, etc. The monomer vapor source may similarly be any monomer vapor source of the prior art, including but not limited to flash evaporation, boat evaporation, Vacuum Monomer Technique (VMT), polymer multilayer (PML) techniques, evaporation from a permeable membrane, or any other source found effective for producing a monomer vapor. For example, the monomer vapor may be created from various permeable metal frits, as previously in the art of monomer deposition. Such methods are taught in U.S. Pat. No. 5,536,323 (Kirlin) and U.S. Pat. No. 5,711,816 (Kirlin), amongst others.

A separate activation may be utilized in some cases for providing additional activation energy during or after deposition of the single-ion conductive material layer. In some cases, such as in certain types of unbalanced magnetron sputtering, plasma immersion, or plasma-enhanced CVD, a separate activation source may not be required, as the sufficient activation is already attained by the deposition method itself. Alternatively, certain types of single-ion conductive materials, such as those that provide catalytic or low work function surfaces, e.g., $ZrO_2$, $Ta_2O_5$, or various oxides and fluorides of Group IA and Group. IIA metals, may provide sufficient activation even in relatively non-activating deposition processes.

Not all of the surface area within a single-ion conductive material layer need be infiltrated by the transport-inhibiting substance to achieve an effective permeation barrier. Accordingly, it is not required that all of the pores within the single-ion conductive material layer be filled. In some cases, less than 10%, less than 25%, less than 50%, less than 75%, or less than 90%, of the pores and/or pinholes can be filled with a polymer, e.g., to achieve decrease in permeation of certain species across the layer. In some cases, the advantages described above can be obtained so long as those pores that substantially contribute to permeation are substantially filled by the polymer.

Other advantages and methods of forming filled single-ion conductive layers are discussed in U.S. Patent Application No. 2005/0051763 (Affinito).

Figure 6:
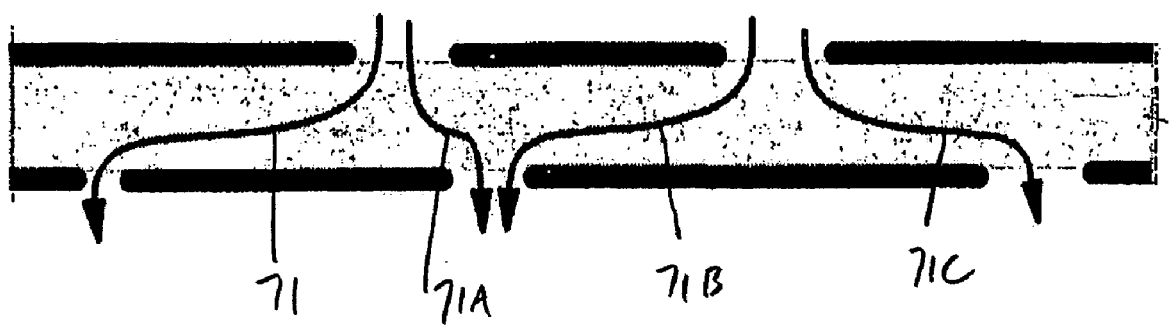
FIG. 6 shows a schematic diagram of an embodiment that increases the barrier to passage of a species.
Figure 7:
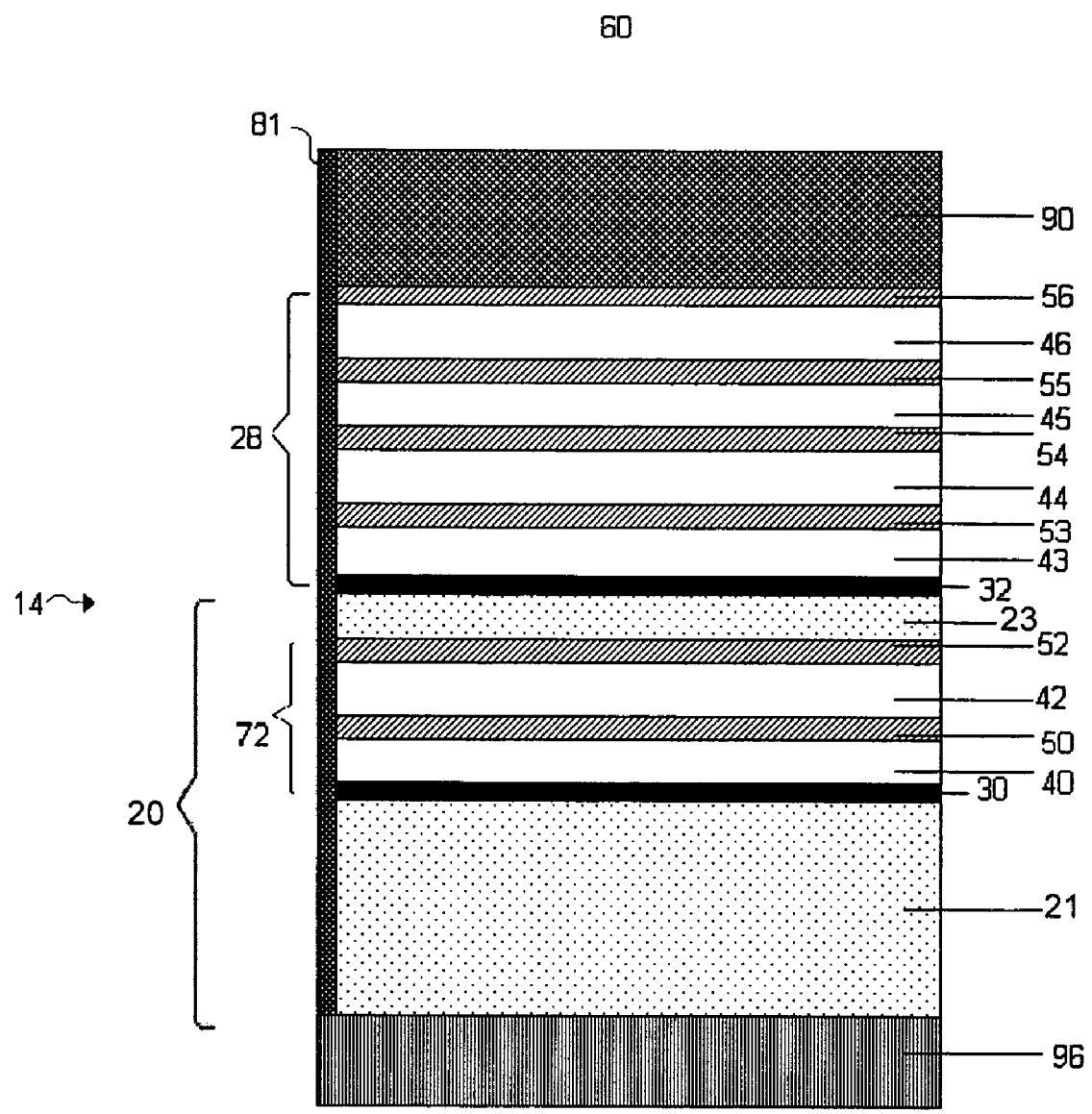
FIG. 7 shows a structure for use in an electrochemical cell, including several multi-layered structures, embedded layers, and separation layers, according to an embodiment of the invention.

FIG. 6 illustrates a principle behind use of a multi-layer electrode stabilization component, such as illustrated in FIGS. 2, 4, and 7, with filled nanopores/pinholes and illustrating the significant barrier to passage of unwanted components from electrolyte to anode through the electrode stabilization layer. In the figure, a tortuous pathway represented by arrow 71 is presented by way of example to show the significant distance, and tortuosity, through which such a species would need to pass to penetrate the entire multi-layer arrangement to arrive at the anode. Where nanopores and pinholes are filled with a penetrating transport-inhibiting substance such as an inhibiting polymeric substance, transport is significantly slowed. This, combined with tortuosity as illustrated, can result in the exponential decrease in transport of such species and exponential increase in cycle life, as noted above. It can be seen how increasing the number of layers, with resultant offset of pinholes existing in ion-conductive materials, creates this tortuous pathway. Where a single layer of such material is used, pinholes can be substantially more easily traversed by unwanted species accessing the electrode. In certain embodiments, the transport-inhibiting substance fills essentially all voids including pinholes and nanopores of the single ion-conducting material, and/or that of the polymer layers. In other arrangements, only a portion of voids of one or both are filled. In some cases, the transport-inhibiting substance is an auxiliary substance, that is, a substance not native to the single ion-conducting material, and/or that of the polymer layers. That is, the material may be a species not forming a portion of one of these components as these components would otherwise be fabricated and assembled together, but is present only through an auxiliary process required to fill such voids. In some cases, the material is not native to either the single-ion conductive material or the polymeric material.

In some embodiments, structures include an outer layer, e.g., a layer that is in contact with the electrolyte of the cell. This outer layer can be a layer such as stabilization layers 22, 24, 26, etc. as shown in the figures, or can be an auxiliary outer layer specifically selected to interface directly with the electrolyte. Where such an auxiliary outer layer is used, it may be selected to be significantly hydrophobic when used in connection with an aqueous electrolyte and a rechargeable lithium battery. Outer layers may be selected for properties such as Li-ion conduction, electron conduction, protection of underlying layers which may be unstable to components present in the electrolyte, nonporous to prevent penetration by electrolyte solvents, compatible with electrolyte and the underlying layers, and flexible enough to accommodate for volume changes in the layers observed during discharge and charge. The outer layer should further be stable and preferably insoluble in the electrolyte.

Examples of suitable outer layers include, but are not limited to, organic or inorganic solid polymer electrolytes, electrically and ionically conducting polymers, and metals with certain lithium solubility properties. In one embodiment, the polymer of the outer layer is selected from the group consisting of electrically conductive polymers, ionically conductive polymers, sulfonated polymers, and hydrocarbon polymers. Further examples of suitable polymers for use in the outer layer of the present invention are those described in U.S. Pat. No. 6,183,901 to Ying et al.

As noted, structures may further comprise a substrate, on a surface of an anode layer, e.g., on a side opposite to that of a multi-layer structure. Substrates are useful as a support on which to deposit the first layer comprising the base electrode material, and may provide additional stability for handling of thin lithium film anodes during cell fabrication. Further, in the case of conductive substrates, these may also function as a current collector useful in efficiently collecting the electrical current generated throughout the anode and in providing an efficient surface for attachment of the electrical contacts leading to the external circuit. A wide range of substrates are known in the art of anodes. Suitable substrates include, but are not limited to, those including metal foils, polymer films, metallized polymer films, electrically conductive polymer films, polymer films having an electrically conductive coating, electrically conductive polymer films having an electrically conductive metal coating, and polymer films having conductive particles dispersed therein.

FIG. 7 shows an example of a structure including several embodiments described herein. As illustrated in the embodiment shown in FIG. 7, structure 14 can include a substrate 96 and a layer 20 (e.g., based on or essentially completely comprising lithium metal). A separation layer 30, which may include a plasma treated layer or a temporary metal layer, may be formed on top of base anode layer 21. The structure may include a second lithium layer 23, and an embedded layer 72 comprising, e.g., alternating polymer layers 40 and 42, and single-ion conductive layers 50 and 52. In some embodiments, the single-ion conductive material layers may comprise, or consist essentially of, a metal. The single-ion conductive layers material may be an IPBM-type structure, e.g., a layer in which the nanopores/pinholes are filled with a suitable polymer to decrease permeation of the layer. A second separation layer 32 may be disposed on top of the second lithium layer 22. Multi-layered structure 28 can include four alternating layers of polymer (e.g., layers 43, 44, 45, and 46) and single-ion conductive materials (e.g., layers 53, 54, 55, and 56). Of course, greater than four polymer/single ion conductive layers can be included. The structure can also include a current collector 81, and an outer layer 90 may be positioned between the anode layer 20 and electrolyte 60 of the cell. In some cases, the layers that protect the anode, e.g., layers between and including separation layer 30 and outer layer 90, can have a total overall thickness of, e.g., less than 5 mm, less than 3 mm, less than 2 mm, less than 1 mm, less than 700 microns, less than 500 microns, less than 400 microns, less than 300 microns, less than 250 microns, less than 200 microns, less than 150 microns, less than 100 microns, less than 75 microns, or less than 50 microns, less than 25 microns, or less than 10 microns.

Advantageously, batteries of the invention can be compact, light weight and can have high energy density. The layers of a cell between and including anode 20 and outer layer 90 may have a total thickness of less than 2 cm, less than 1.5 cm, less than 1 cm, less than 0.7 cm, less than 0.5 cm, less than 0.3 cm, less than 1 mm, less than 700 microns, less than 500 microns, less than 400 microns, less than 300 microns, less than 250 microns, less than 200 microns, less than 150 microns, less than 100 microns, less than 75 microns, or less than 50 microns, less than 25 microns, or less than 10 microns, e.g., depending on the particular application of the cell. Embodiments such as structures 14 may be suitable for use with electrolytes such as aqueous solvents, e.g., water, and can operate as either primary or secondary cells.

Suitable cathode active materials for use in the cathode of the electrochemical cells of the invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, $S_m$, selected from the group consisting of covalent $—S_m—$ moieties, ionic $—S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In another embodiment, m of the polysulfide moiety, $S_m$, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, $S_m$, is covalently bonded by one or both of its terminal sulfur atoms as a side group to the polymer backbone chain. In yet another embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. patent application Ser. No. 08/995,122 now U.S. Pat. No. 6,201,100 issued Mar. 13, 2001, to Gorkovenko et al. of the common assignee and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Cathodes may further comprise one or more conductive fillers to provide enhanced electronic conductivity. Examples of conductive fillers include, but are not limited to, those including conductive carbons, graphites, activated carbon fibers, non-activated carbon nanofibers, metal flakes, metal powders, metal fibers, carbon fabrics, metal mesh, and electrically conductive polymers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include polytetrafluoroethylenes (Teflon), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, may be present in the range of 2 to 30% by weight of the cathode active layer.

The electrolytes used in electrochemical or battery cells can function as a medium for the storage and transport of ions, and in the special case of solid electrolytes and gel electrolytes, these materials may additionally function as a separator between the anode and the cathode. As noted, in one set of embodiments an aqueous-based electrolyte is used. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte may be electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$. Other electrolyte salts that may be useful include lithium polysulfides ($Li_2S_x$), and lithium salts of organic ionic polysulfides ($LiS_xR)_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

As noted above, a variety of ion-conductive species, and polymeric species, are useful in connection with the invention. In some cases, ion conductive species that are also electrically conductive are employed. In other cases, ion conductor species that are substantially non-electrically conductive are employed.

Examples of ion conductor species, including single-ion-conductive species suitable for use in the invention, which are also substantially electrically conductive, include lithium alloys such as lithium combined with Group 14 and Group 15 metals (e.g., Ge, Sn, Pb, As, Sb, Bi). Polymers that are conductive to single ions that are also substantially electrically conductive include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Electrically-conductive additives may also be added to polymers to form electrically-conductive polymers. Certain electrically conductive materials may have a conductivity of, e.g., greater than $10^{-2}$ S/cm, greater than $10^{-1}$ S/cm, greater than 1 S/cm, greater than $10^1$ S/cm, greater than $10^2$ S/cm, greater than $10^3$ S/cm, greater than $10^4$ S/cm, or greater than $10^5$ S/cm. Examples of ion-conductive species that are substantially non-electrically conductive include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive but substantially non-electrically conductive. In some embodiments, single-ion conductive materials can also include non-polymeric materials. Certain non-electrically conductive materials may have a resistivity of, e.g., greater than $10^3$ ohm-cm, greater than $10^4$ ohm-cm, greater than $10^5$ ohm-cm, greater than $10^6$ ohm-cm, greater than $10^7$ ohm-cm, or greater than $10^8$ ohm-cm. Those of ordinary skill in the art can select single ion conductive species that are both substantially electrically conductive and substantially non-electrically conductive without undue experimentation, and can employ a simple screening test to select from candidate materials. The simple screening test involves positioning a material as a separator in an electrochemical cell which, to function, requires passage of both an ionic species and electrons across the material. This is a simple test to employ. If the material is substantially ionically conductive and electronically conductive in this test, then resistance or resistivity across the material will be low. Other simple tests can be conducted by those of ordinary skill in the art.

The invention also employs polymeric materials, some of which are ionically-conductive and some of which are electronically conductive. As is the case for single ion conductive materials that are or are not electronically conductive, those of ordinary skill in the art can readily select, or formulate, such polymeric materials. These polymeric materials also can be selected or formulated to have physical/mechanical characteristics as described above by, for example, tailoring the amounts of components of polymer blends, adjusting the degree of cross-linking (if any), etc. Simple screening tests such as those described above can be used to select polymers that have the appropriate ionic and/or electronic properties.

Suitable polymer layers for use in a multi-layered structure include polymers that are highly conductive towards lithium and minimally conductive towards electrons include, for example, ionically conductive polymers, sulfonated polymers, and hydrocarbon polymers. The selection of the polymer will be dependent upon a number of factors including the properties of electrolyte and cathode used in the cell. Suitable ionically conductive polymers include, e.g., ionically conductive polymers known to be useful in solid polymer electrolytes and gel polymer electrolytes for lithium electrochemical cells, such as, for example, polyethylene oxides. Suitable sulfonated polymers include, e.g., sulfonated siloxane polymers, sulfonated polystyrene-ethylene-butylene polymers, and sulfonated polystyrene polymers. Suitable hydrocarbon polymers include, e.g., ethylene-propylene polymers, polystyrene polymers, and the like.

Polymer layers of a multi-layered structure can also include crosslinked polymer materials formed from the polymerization of monomers such as alkyl acrylates, glycol acrylates, polyglycol acrylates, polyglycol vinyl ethers, polyglycol divinyl ethers, and those described in U.S. Pat. No. 6,183,901 to Ying et al. of the common assignee for protective coating layers for separator layers. For example, one such crosslinked polymer material is polydivinyl poly(ethylene glycol). The crosslinked polymer materials may further comprise salts, for example, lithium salts, to enhance ionic conductivity. In one embodiment, the polymer layer of the multi-layered structure comprises a crosslinked polymer.

Other classes polymers that may be suitable for use in a polymer layer include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexyl-cynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyamides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). The mechanical and electronic properties (e.g., conductivity, resistivity) of these polymers are known. Accordingly, those of ordinary skill in the art can choose suitable polymers for use in lithium batteries, e.g., based on their mechanical and/or electronic properties (e.g., ionic and/or electronic conductivity), and/or can modify such polymers to be ionically conducting (e.g., conductive towards single ions) and/or electronically conducting based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

The figures that accompany this disclosure are schematic only, and illustrate a substantially flat battery arrangement. It is to be understood that any electrochemical cell arrangement can be constructed, employing the principles of the present invention, in any configuration. For example, with reference to FIG. 1, anode 20 may be covered on the side opposite the side at which components 30, 40, and 50 are illustrated with a similar or identical set of components 30, 40, and 50. In this arrangement, a substantially mirror-image structure is created with a mirror plane passing through anode 20. This would be the case, for example, in a "rolled" battery configuration in which a layer of anode 20 is surrounded on each side by structures 30, 40, and 50 (or, in alternative arrangements layered structures illustrated in other figures herein). On the outside of each protective structure of the anode an electrolyte is provided and, opposite the electrolyte, a cathode. In a rolled arrangement, or other arrangement including multiple layers of alternating anode and cathode functionality, the structure involves anode, electrolyte, cathode, electrolyte, anode . . . , where each anode can include anode stabilization structures as described in any part of this disclosure. Of course, at the outer boundaries of such an assembly, a "terminal" anode or cathode will be present. Circuitry to interconnect such a layered or rolled structure is well-known in the art.

The following examples are intended to illustrate certain embodiments of the present invention, but are not to be construed as limiting and do not exemplify the full scope of the invention.

EXAMPLE 1

Fabrication and Characterization of Lamanode Structures

Lamanode structures, e.g., structures including a first and second layers of Li separated by an embedded layer that is conductive to Li ions, but substantially non-conductive to electrons, were fabricated by thermal evaporation (vacuum deposition) of Li on a PET substrate in two layers of Li with different thickness. The two layers of Li were separated by an embedded layer of a low-conductive material, e.g., LiPON, Li$_3$N or etc. The ratio of the thickness of top and bottom Li layers was calculated based on a required DoD (depth of discharge) of the first discharge and was in the range between 0.2 to 0.4. A layer of about 0.01 to 1 micron LiPON was deposited on top of the bottom thicker Li layer by rf magnetron spattering from a Li$_3$PO$_4$ target in an N$_2$ atmosphere. A thinner Li layer, e.g., 5 microns, was thermally evaporated on top of the embedded layer.

The top (thinner) Li layer interfacing the electrolyte was dissolved at the first discharge. During the next charge, Li was deposited on the surface of the low-conductive LiPON embedded layer. During the second discharge, the Li deposit was dissolved to an extent depending on its cycling efficiency. The Li cycling efficiency(Eff) is defined by equation (1)

$$E_{eff}=Q_d/Q_c \qquad (1),$$

where Q$_c$ is the amount of Li deposit in Ah and Q$_a$ is the amount of dissolved Li in Ah. At a Li efficiency less than 1, an extra amount of Li was dissolved from the bulk to complete a 100% cycle. E$_{eff}$ for a practical system is typically higher than 0.98. Therefore, during the second discharge, a negligible amount of Li compared to the total cathode charge was transferring from the bulk Li through the embedded layer(s) to the electrolyte and the cathode. This amount, 100 times smaller than the amount of Li fluxing during the first anodic dissolution of Li and cathode lithiation, practically does not affect the surface morphology of the bottom layer of Li and the adjusted protective layer. The same scenario repeats with any subsequent 100% cycle to the cell end of life. As fewer defects, cracks and pinholes are formed on the Li and the adjusted embedded layer surfaces, the Li cycling efficiency increases and the cycle life is longer. Such a laminode can be built in a cell along with a cathode, e.g., having 60 to 75% sulfur and an electrolyte compatible with the sulfur chemistry.

In one embodiment, small prismatic cells including working and counter electrodes with a geometric surface of 30 cm$^2$ and a polyethylene "Tonen" separator with a thickness of 16 microns between were sealed in an aluminized plastic polyethylene bag of "Sealrite". A solution of a mixture of ethers and Li amide salt was added in the bag to serve as an electrolyte. Two types of cells were built:

A) Li working electrode with a thickness about 25 microns made by thermal evaporation of Li on 23 um PET called for simplicity. This single-layered electrode was used as a control.

B) Li working electrode with approximately the same thickness including a three layered structure, e.g., a laminode. The laminode was made by:

i) 20 micron thermal evaporated Li on PET, ii) 0.075 micron of LiPON made by rf magnetron spattered from a Li$_3$PO$_4$ target in an N$_2$ atmosphere on the top of the 20 micron Li; and iii) 5 micron thermal evaporated Li on top of the layer of LiPON.

Both cell designs used a counter electrode of 25 micron thermal evaporated Li on 23 micron PET. The cells were discharged using the same conditions of a current of 0.2 mA/cm$^2$ and a 20% DoD of Li. After the discharge, the cells were opened in a glove box and the working electrode was studied by SEM.

Figure 8A:
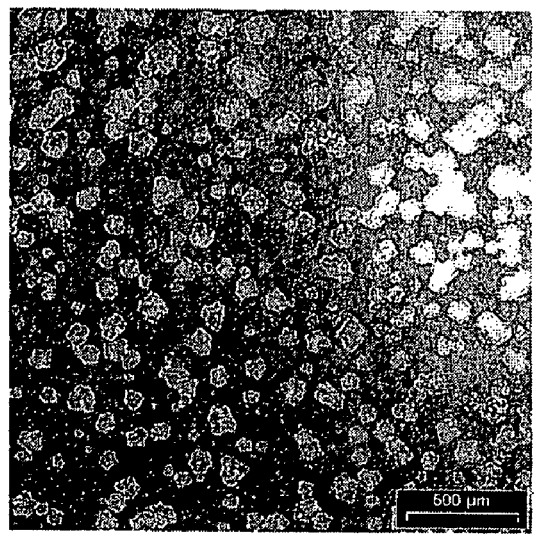
FIG. 8 shows SEM images of Li anode surfaces after a $1^{st}$ discharge, according to an embodiment of the invention.
Figure 8B:
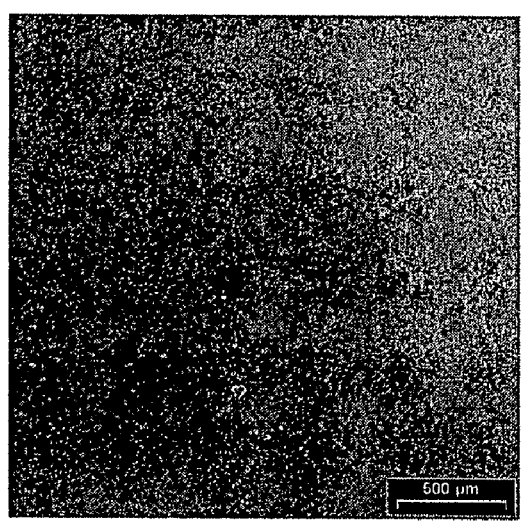
Figure 8C:
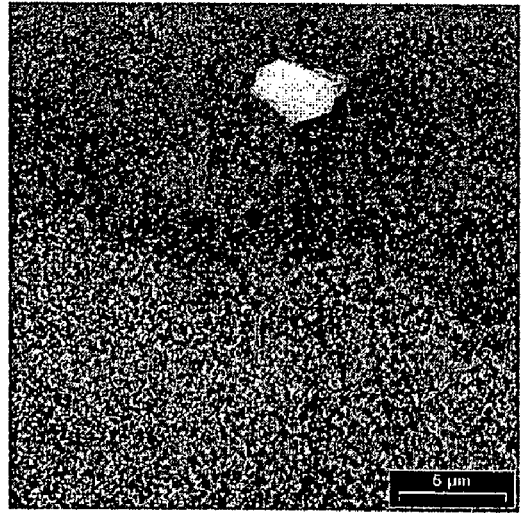

The results from these experiments are shown in FIG. 8. FIG. 8A shows a SEM image of the control, and FIG. 8B shows the laminode structure. FIG. 8C shows a 5000 times magnification of the structure shown in FIG. 8B after the removal of the top Li layer. It can be observed from the SEM pictures that the laminode structure is substantially free of any defects such as cracks and pinholes. The single layered Li surface control, however, is strongly affected under the conditions of the first discharge.

This example shows that a laminode structure including a first and second layers of Li separated by an embedded layer that is conductive to Li ions, but substantially non-conductive to electrons, can increase the desired properties of an electrochemical cell.

EXAMPLE 2

Cycle Lives of Lamanode Structures

This example shows that the Li cycling efficiency increases and the cycle life is longer for cells including laminode structures compared to cells having single layers of base electrode materials.

To fabricate control cells, prismatic cells with thermal evaporated Li on one side of 23 micron thickness of PET, Separator Tonen and a cathode containing 65% S coated on one side of a Rexam Al foil were sealed in a bag of Sealright. A mixture of ethers and Li imide salt was used as an electrolyte. The working surface of the anode was 400 $cm^2$. The cells were tasted for cycle life performance at a discharge current of 200 mA to a cut-off of 1.8 V, and charge current of 0.1 A for 4 hours. Cycling results obtained from three control cells were obtained.

The same cell design as described above was built but with a first laminode anode structure (or "sandwich anode") instead of a single-layered anode. The first laminode structure included a 20 micron thick thermal evaporated Li deposited on 23 microns of PET. A layer of 0.02 micron of LiPON was rf magnetron sputtered from a $Li_3PO_4$ target in an $N_2$ atmosphere on top of the 20 micron thick Li, and 5 microns of Li was thermally evaporated on top of the embedded LiPON layer. The same test regime as for the control cells was applied for these cells.

The average FoM (Li cycling efficiency) of the controls was compared to that of the first laminode-containing cells, with the result that a significant improvement in the cycle life of the cells was realized.

Similar cells as those above were built and tested under the same conditions using a second laminode structure, including a 20 micron thick thermally evaporated Li layer, a 0.075 micron thick LiPON layer, and a 5 micron thermally evaporated Li layer.

Comparing the FoM obtained from the second laminode structure with that of the control, a significant improvement in the cycle life of the laminode structures compared to the control anode was observed.

This example shows that the Li cycling efficiency increases and the cycle life is longer for cells including laminode structures compared to cells having single layers of base electrode materials.

EXAMPLE 3

Effects of Different Types of Anode Protection on Discharge Capacity

This example shows effects of different types of anode protection on discharge capacity of a cell.

The control used in these experiments included a VDLi/$CO_2$ structure, equivalent to a Li foil. A first test structure included a VDLi/$CO_2$/polymer (1500-2500 Angstroms) structure. A second test structure included a VDLi/$CO_2$/polymer (1500-2500 Angstroms) structure. A third test structure included a laminode (Sandwich anode) of VDLi/LiPON/VDLi/$CO_2$/SPE. In this particular experiment, each of the cells were cycled several times, and an improvement of 30-40% in cycle life was obtained when the cell included a polymer layer compared to a cell without a polymer layer. A significant improvement in cycle life was obtained when a cell included an embedded layer of LiPON compared to a cell without an embedded layer. A cell that included a laminode structure having an embedded layer and a polymer layer, e.g., a VDLi/LiPON/VDLi/$CO_2$/SPE cell, had a significant improvement in cycle life compared to a cell having single-layered anode, e.g., VDLi/$CO_2$. In other embodiments, the degree of improvement in life-cycle can vary depending on, for example, the number of polymer layers, multi-layered structures, and embedded layers that make up the cell, and the thicknesses and materials used to form such structures.

This example shows that electrochemical cells including embedded and polymer layers have increased cycle lives compared to cells without such structures.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell comprising:
an electrode comprising:
a first layer comprising lithium metal as an active electrode species;
a second layer consisting essentially of lithium metal as an active electrode species, at least some of which is depleted and replated upon discharge and charge, respectively, of the electrochemical cell; and
a single-ion conductive layer separating the first layer from the second layer and substantially preventing electronic communication between the first and second layers across the layer;
wherein the second layer is positioned so as to reside between the first layer and an electrolyte used with the cell.

2. An electrochemical cell as in claim 1, wherein the electrode further comprises a protective metal layer.

3. An electrochemical cell as in claim 1, further comprising a protective layer positioned between the electrode and an electrolyte used with the cell, wherein the protective layer is a single-ion conductive, electronically conductive material.

4. An electrochemical cell as in claim 1, further comprising a protective layer positioned between the electrode and an electrolyte used with the cell, wherein the protective layer is substantially similar in composition to the single-ion conductive layer separating the first layer from the second layer.

5. An electrochemical cell as in claim 1, further comprising a current collector in electronic communication with both the first layer and the second layer.

6. An electrochemical cell as in claim 5, wherein the first and second layers define a layered structure with at least one edge, and the current collector is in contact with the edge of the anode across both the first and second layers.

7. An electrochemical cell as in claim 1, wherein the single-ion conductive layer comprises a glass conductive to lithium ions.

8. An electrochemical cell as in claim 1, wherein the single-ion conductive layer comprises lithium nitride.

9. An electrochemical cell as in claim 1, wherein the single-ion conductive layer comprises pores and at least a portion of the pores are filled with a polymer.

10. An electrochemical cell as in claim 9, wherein the polymer is in the form of a polymer layer that is positioned adjacent the single-ion conductive layer.

11. An electrochemical cell as in claim 1, wherein the single-ion conductive layer is non-electronically conductive.

12. An electrochemical cell as in claim 9, wherein the polymer comprises an acrylate.

13. An electrochemical cell as in claim 12, wherein the acrylate is selected from the group consisting of alkyl acrylates, glycol acrylates, and polyglycol acrylates.

14. An electrochemical cell as in claim 1, wherein the electrode is an anode.

15. An electrochemical cell as in claim 1, wherein the second layer comprises an amount of the active electrode species prior to first discharge of the cell such that greater than 70% of the active electrode species of the second layer is electrochemically dissolved upon first discharge.

16. A lithium-sulfur electrochemical cell comprising:
an electrode comprising:
a first layer comprising lithium metal as an active electrode species;
a second layer consisting essentially of lithium metal as an active electrode species, at least some of which is depleted and replated upon discharge and charge, respectively, of the electrochemical cell; and
a single-ion conductive layer separating the first layer from the second layer and substantially preventing electronic communication between the first and second layers across the layer;
wherein the second layer is positioned so as to reside between the first layer and an electrolyte used with the cell.

17. An electrochemical cell as in claim 16, wherein the single-ion conductive layer comprises lithium nitride.

18. An electrochemical cell as in claim 16, wherein the second layer comprises an amount of the active electrode species prior to first discharge of the cell such that greater than 70% of the active electrode species of the second layer is electrochemically dissolved upon first discharge.

19. An electrochemical cell as in claim 1, wherein most or all of the active electrode species in the second layer is removed upon full discharge of the electrochemical cell.

* * * * *

UNITED STATES PATENT AND TRADEMARK OFFICE
CERTIFICATE OF CORRECTION

PATENT NO.         : 7,771,870 B2                           Page 1 of 1
APPLICATION NO.    : 11/400025
DATED              : August 10, 2010
INVENTOR(S)        : John D. Affinito et al.

It is certified that error appears in the above-identified patent and that said Letters Patent is hereby corrected as shown below:

At column 34, Claim 1, line 4, "across the layer;" should read --across the single-ion conductive layer;--

At column 34, Claim 16, line 62, "across the layer;" should read --across the single-ion conductive layer;--

Signed and Sealed this
First Day of March, 2011

David J. Kappos
*Director of the United States Patent and Trademark Office*